US012570344B2

(12) United States Patent
Armbruster et al.

(10) Patent No.: US 12,570,344 B2
(45) Date of Patent: Mar. 10, 2026

(54) CONNECTION DEVICE FOR CONNECTING CLEANING CARTS AND CLEANING SYSTEM COMPRISING TWO OR MORE CLEANING CARTS

(71) Applicant: ALFRED KÄRCHER SE & CO. KG, Winnenden (DE)

(72) Inventors: Patrick Armbruster, Winnenden (DE); Jochen Burchard, Winnenden (DE); Denis Dammköhler, Winnenden (DE); Kamila Dobler, Winnenden (DE); Beyza Guegercin, Winnenden (DE); Marten Jahn, Winnenden (DE); Jens Kuhn, Winnenden (DE); Calogero Maniscalco, Winnenden (DE)

(73) Assignee: ALFRED KÄRCHER SE & CO. KG, Winnenden (DE)

( * ) Notice: Subject to any disclaimer, the term of this patent is extended or adjusted under 35 U.S.C. 154(b) by 713 days.

(21) Appl. No.: 18/050,379

(22) Filed: Oct. 27, 2022

(65) Prior Publication Data

US 2023/0182798 A1      Jun. 15, 2023

Related U.S. Application Data

(63) Continuation of application No. PCT/EP2021/058290, filed on Mar. 30, 2021.

(30) Foreign Application Priority Data

Apr. 29, 2020    (DE) ..................... 10 2020 111 727.2

(51) Int. Cl.
 B62B 5/00     (2006.01)
 A47L 13/51     (2006.01)
 B62B 3/00     (2006.01)
(52) U.S. Cl.
 CPC ................ B62B 5/00 (2013.01); A47L 13/51 (2013.01); B62B 3/00 (2013.01); B62B 2207/00 (2013.01)
(58) Field of Classification Search
 CPC ................................ B62B 3/02; B62B 220/20
(Continued)

(56) References Cited

U.S. PATENT DOCUMENTS 2,710,225 A * 6/1955 Richards ............... F27D 25/008
                                                    15/317
6,550,794 B1 * 4/2003 Spindel ................... B60D 1/00
                                                    280/33.993
(Continued)

FOREIGN PATENT DOCUMENTS

DE        9403468       5/1994
EP        1841634       10/2007
(Continued)

OTHER PUBLICATIONS

International Search Report and Written Opinion for International (PCT) Patent Application No. PCT/EP2021/058290, dated Jun. 28, 2021, 10 pages.
(Continued)

*Primary Examiner* — John Olszewski
*Assistant Examiner* — Nathaniel William Watkins
(74) *Attorney, Agent, or Firm* — Sheridan Ross P.C.

(57) ABSTRACT

The present invention relates to a connection device for connecting a first cleaning cart to a second cleaning cart along a connecting direction, each configured for receiving cleaning utensils and comprising rollers for moving on a ground surface, wherein the connection device comprises a first connecting part fixed or fixable to the first cleaning cart and a second connecting part fixed or fixable to the second cleaning cart, wherein the respective connecting part comprises a base region and a projection region projecting therefrom in a direction towards the respective other connecting part, wherein a first locking element is arranged at the first projection region of the first connecting part and a second locking element is arranged at the second projection region of the second connecting part, wherein the locking elements are configured to be in engagement with one another when in a locking position and to be out of engagement when in an unlocking position, and wherein the projection regions are arranged transversely and in particular perpendicularly to the connecting direction, in lateral side-by-side relation to one another. The invention further relates to a cleaning system with two or more cleaning carts and a connection device.

34 Claims, 15 Drawing Sheets

(58) Field of Classification Search
      USPC ........................................................ 180/507
      See application file for complete search history.

(56)                    References Cited

U.S. PATENT DOCUMENTS

| | | | |
|---|---|---|---|
| 6,974,140 B2 * | 12/2005 | Neuman ................. | B62B 3/108 |
| | | | 403/322.2 |
| 2002/0109318 A1 * | 8/2002 | Calmeise ................ | A47L 13/51 |
| | | | 280/47.35 |
| 2006/0163827 A1 | 7/2006 | Lauer et al. | |
| 2008/0302585 A1 * | 12/2008 | Perelli ................... | B62B 5/0033 |
| | | | 180/14.1 |
| 2012/0134771 A1 | 5/2012 | Larson et al. | |
| 2012/0267869 A1 | 10/2012 | Hassell | |
| 2017/0151974 A1 * | 6/2017 | Stahl ...................... | B60D 1/481 |
| 2021/0146981 A1 * | 5/2021 | You ......................... | B62B 3/022 |

FOREIGN PATENT DOCUMENTS

| | | | | |
|---|---|---|---|---|
| EP | 3095668 | | 11/2016 | |
| EP | 3095668 A1 * | 11/2016 | .............. | B62B 3/02 |
| EP | 3453587 | | 3/2019 | |
| EP | 3501941 | | 6/2019 | |
| GB | 2497132 | | 6/2013 | |
| GB | 2497132 A * | 6/2013 | .............. | B62B 3/02 |

OTHER PUBLICATIONS

Search Report for Germany Patent Application No. 10-2020-111727.
2, dated Apr. 29, 2020, 8 pages.

* cited by examiner

CONNECTION DEVICE FOR CONNECTING CLEANING CARTS AND CLEANING SYSTEM COMPRISING TWO OR MORE CLEANING CARTS

CROSS-REFERENCE TO RELATED APPLICATIONS

This application is a continuation application of international application number PCT/EP2021/058290, filed on Mar. 30, 2021, and claims the benefit of German application number 10 2020 111 727.2, filed on Apr. 29, 2020, which are incorporated herein by reference in their entirety and for all purposes.

FIELD OF THE INVENTION

The present invention relates to a connection device for connecting a first cleaning cart to a second cleaning cart.

Furthermore, the present invention relates to a cleaning system comprising two or more cleaning carts which can be connected by way of a connection device.

BACKGROUND OF THE INVENTION

Despite modern cleaning machines, in particular in the field of interior cleaning, some of which can be automated, cleaning carts are of great importance in the field of daily cleaning. A particular emphasis is on cleaning tasks that are to be manually performed in larger buildings, such as office buildings, hotels, nursing facilities, hospitals, airports, event buildings, or the like. The cleaning carts serve to carry cleaning utensils. Examples of these include, in particular, manually guided cleaning tools, receptacles for storing cleaning accessories, cleaning liquids or cleaning chemicals, receptacles for receiving dirty liquid or waste, cleaning cloths, or other items for surface cleaning.

The cleaning carts comprise rollers so that they can be moved by a user over a ground surface in a hand-guided manner. Where carts are connected, a handle device for the user is preferably arranged or formed for this purpose on at least one cleaning cart.

In the present case, the rollers can be stationary, i.e., unsteered. Alternatively, provision can be made for the rollers to be steered rollers. A combination of unsteered rollers and steered rollers can also be provided.

The cleaning carts usually comprise a frame for receiving the cleaning utensils. In the present case, an open frame, for example for arranging receptacles, can be considered to be a frame. In particular, a closed frame in the sense of a corpus comprising, for example, side walls and/or doors for closing off a receiving space for cleaning utensils can also be considered to be a frame in the present case.

It is known that cleaning carts can be connected to one another. For example, two or more cleaning carts can be moved from a setup location to a work location where they can be separated from one another to carry out different cleaning tasks. It is also known that cleaning carts are connected to one another as a supply module and a disposal module, corresponding to the cleaning task and separation between clean area and dirty area they are to perform. The supply module can accommodate cleaning tools and, in particular, clean cleaning utensils. The disposal module can receive dirty cleaning utensils and/or a receptacle for receipt of waste. After the cleaning, the disposal module can for example be separated from the supply module, any waste disposed of and cleaning utensils cleaned, to avoid cross-contamination.

It is known that cleaning carts can be connected near ground level via a connection device that is connectable by foot actuation. This has proven to be cumbersome in practice because the user's view is obstructed and the proper relative positioning is made difficult for the user, in particular because the cleaning cart that is not being guided by the user can, by its rollers, inadvertently move on the ground surface. In a different connection device, a bracket is provided which is hooked onto a bar of the other cleaning cart. This can accomplish connection to only an unreliable degree.

Connection devices for cleaning carts are described, for example, in EP 3 453 587 A1, US 2017/0151974 A1, EP 3 095 668 B1 and GB 2 497 132 A.

An object underlying the present invention is to provide a connection device for connecting cleaning carts and a cleaning system which enables the cleaning carts to be connected in a more user-friendly manner.

SUMMARY OF THE INVENTION

In a first aspect of the invention, a connection device for connecting a first cleaning cart to a second cleaning cart along a connecting direction is provided, wherein the cleaning carts are each configured for receiving cleaning utensils and comprise rollers for moving on a ground surface. The connection device comprises a first connecting part fixed or fixable to the first cleaning cart and a second connecting part fixed or fixable to the second cleaning cart. The respective connecting part comprises a base region and a projection region projecting therefrom in a direction towards the respective other connecting part. A first locking element is arranged at the first projection region of the first connecting part and a second locking element is arranged at the second projection region of the second connecting part. The locking elements are configured to be in engagement with one another when in a locking position and to be out of engagement when in an unlocking position. The projection regions are arranged transversely and in particular perpendicularly to the connecting direction, in lateral side-by-side relation to one another.

In a second aspect of the invention, a cleaning system is provided. The cleaning system comprises a first cleaning cart and a second cleaning cart, which are each configured for receiving cleaning utensils and comprise rollers for moving on a ground surface. Preferably at least one cleaning cart is hand-guided by way of a handle device. The cleaning system comprises a connection device in accordance with the first aspect. The first connecting part is fixed or fixable to the first cleaning cart and the second connecting part is fixed or fixable to the second cleaning cart.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
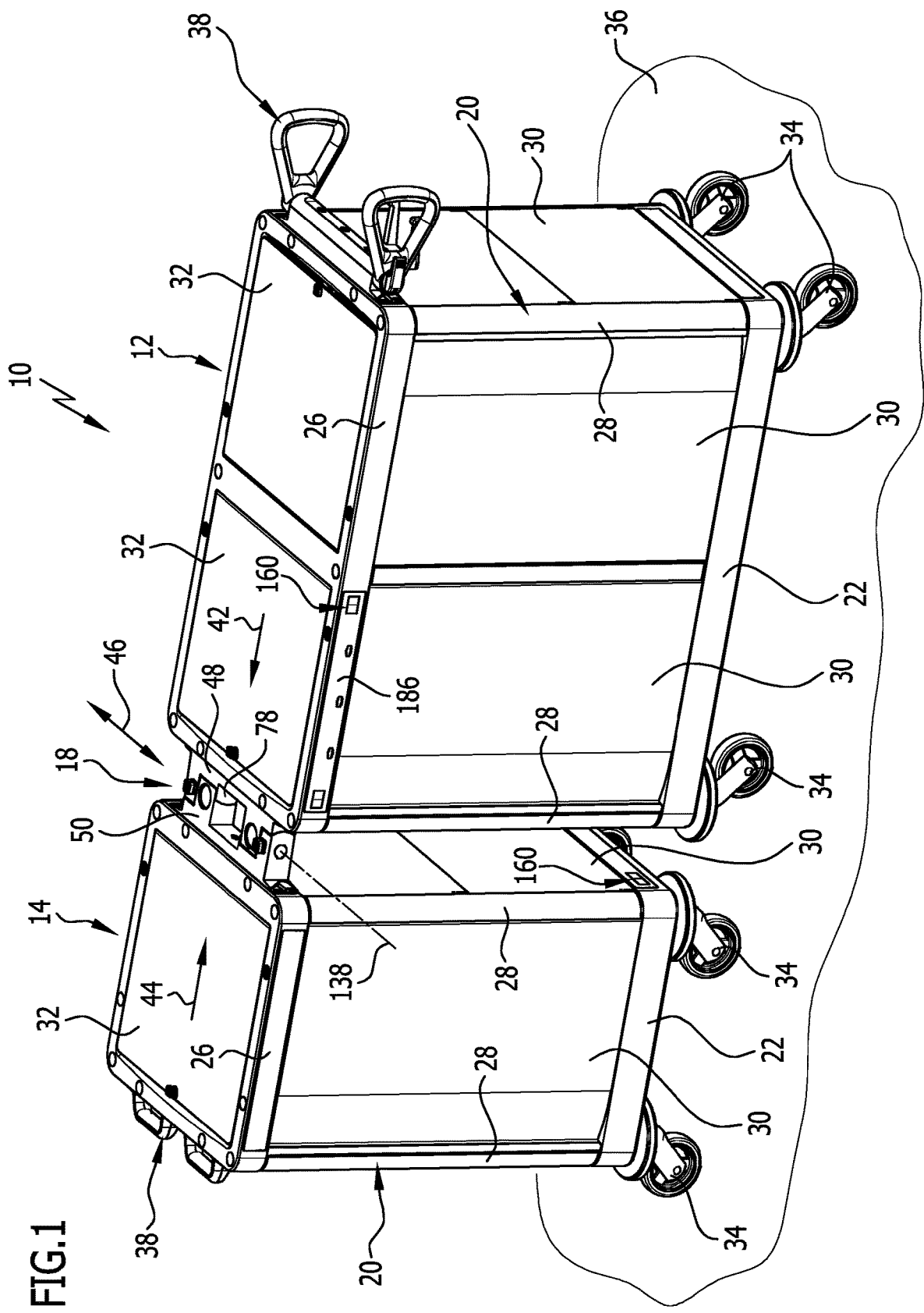
FIG. 1 illustrates a perspective representation of a cleaning system in accordance with the invention, comprising two connected cleaning carts and a connection device in accordance with the invention.

Although the invention is illustrated and described herein with reference to specific embodiments, the invention is not intended to be limited to the details shown. Rather, various modifications may be made in the details within the scope and range of the equivalents of the claims and without departing from the invention.

The present invention relates to a connection device for connecting a first cleaning cart to a second cleaning cart along a connecting direction, each configured for receiving cleaning utensils and comprising rollers for moving on a ground surface, wherein the connection device comprises a first connecting part fixed or fixable to the first cleaning cart and a second connecting part fixed or fixable to the second cleaning cart, wherein the respective connecting part comprises a base region and a projection region projecting therefrom in a direction towards the respective other connecting part, wherein a first locking element is arranged at the first projection region of the first connecting part and a second locking element is arranged at the second projection region of the second connecting part, wherein the locking elements are configured to be in engagement with one another when in a locking position and to be out of engagement when in an unlocking position, and wherein the projection regions are arranged transversely and in particular perpendicularly to the connecting direction, in lateral side-by-side relation to one another.

The following statements are made under the assumption of an intended use of the connection device with the cleaning carts and, correspondingly, under the assumption of an intended use of the cleaning system. In particular, here, provision can be made for the cleaning carts when in their intended use to be supported, via their rollers, on a ground surface. The ground surface here can be assumed to be oriented horizontally, without limitation.

The present invention incorporates the consideration that the cleaning carts, in order for them to be capable of being connected to one another, preferably are to be approximated to one another in a defined connecting direction. A connection device having a first connecting part and a second connecting part is provided for the connection. The connection device can be fixed or fixable to the first or second cleaning cart via a respective base region. Preferably, here, the connecting parts are each arranged in a defined position at the cleaning cart. Projecting from the base region in a direction towards the respective other connecting part are a first projection region at the first connecting part and a second projection region at the second connecting part. The projection regions are arranged in lateral side-by-side relation in a direction transverse and in particular perpendicular to the connecting direction. This direction, hereinafter referred to as the transverse direction, is preferably oriented parallel to a contact plane of the respective cleaning cart defined by the rollers thereof, in particular horizontally. By having the projection regions positioned laterally side by side in the transverse direction, the user is given simple and reliable control of their relative orientation when connecting the cleaning carts to one another. It has been shown in practice that this provides a way of considerably simplifying the orientation of the cleaning carts. The same applies to the relative positioning of the locking elements which are arranged at the projection regions. By having the projection regions arranged in lateral side-by-side relation, the user can, in an easy-to-handle manner, bring the locking elements to a relative position so that the locking elements can assume the locking position.

In order to facilitate the orientation of the connecting parts and, therefore, of the cleaning carts relative to one another by a user, it is advantageous for the first projection region and the second projection region to be arranged in direct lateral side-by-side relation to one another in the transverse direction.

In particular, it is preferably provided for no projection region of one connecting part to be arranged on both sides of the projection region of the other connecting part. This facilitates the relative orientation of the connecting parts to one another.

Preferably, the respective projection region can be connected in one piece to the associated base region.

Provision can be made for the base region to form a socket relative to which the projection region projects.

Alternatively, provision can be made for the base region and the projection region to have the same or substantially the same cross section in a plane transverse and in particular perpendicular to the connecting direction.

It is advantageous for the projection regions of the first connecting part and the second connecting part to be in contact laterally against one another via corresponding contact elements. In this way, reliable relative positioning of the connecting parts can be ensured in a user-friendly manner. In particular, the projection regions can be in area contact against one another.

It is advantageous for at least one of the projection regions to have, in the area of the contact element thereof, a taper starting from the base region in a direction towards the respective other connecting part. The cross section of the projection region narrows via the taper in a direction towards the other connecting part. This provides a way of facilitating the relative orientation of the connecting parts when the cleaning carts are approximated to one another. For example, the taper can be achieved by at least one of the above-mentioned contact elements having an inclination relative to the connecting direction. By way of example, the inclination can assume an angle of approximately 10° to 40° relative to the connecting direction. The inclined contact element can serve as an orientation aid with respect to the respective other projection region.

Preferably, both projection regions can have a taper of the above-described type.

It can be advantageous for at least one of the projection regions to have bevels on a side thereof that faces away from the base region in order to facilitate the relative orientation of the connecting parts when they are approximated to one another. The bevels are, for example, chamfers on an end face of the corresponding projection region that faces away from the base region of the connecting part.

In the following, unless explained otherwise, the connecting parts will be assumed to be in the interconnected state.

It is advantageous for the locking elements to be transferable into the locking position and/or the unlocking position by hand and/or without tools.

When in the locking position, the first locking element and the second locking element can be in engagement with one another in a force-locking and/or form-locking manner, for example.

Provision can be made for the first locking element and the second locking element to be clamped together and/or latched together when in the locking position.

In a preferred embodiment, it is advantageous for the first locking element and the second locking element to comprise a locking projection movably arranged on one of the projection regions and a receptacle for the projection that is arranged on the respective other projection region. The projection can engage in the receptacle in the locking position. The projection is out of engagement with the receptacle in the unlocking position.

In particular, provision can be made for the first locking element to be the projection and for the second locking element to be the receptacle. Correspondingly, the projection can be arranged at the (first) projection region of the first connecting part, and the receptacle can be arranged at the (second) projection region of the second connecting part.

Alternatively, the first locking element can be the receptacle and the second locking element the projection.

In a preferred embodiment of the invention, the projection is configured as a locking pin, and the receptacle is configured as a blind hole or as a through-opening at the projection region.

It is advantageous for the projection and the receptacle each to have a round and in particular circular cross section. This facilitates the insertion of the projection in the receptacle.

For example, the round and in particular circular cross section can prove to be advantageous when the connecting parts are pivotable relative to one another about a common pivot axis defined by the projection and the receptacle.

At least one locking element is preferably movably and in particular displaceably supported on the projection region. By virtue of the movable support, reliable functioning of the connection device can be ensured. By way of example, the above-mentioned projection is movably or displaceably supported.

The first locking element and the second locking element, in particular the projection and the receptacle, are preferably oriented in a coaxial relation to one another, with respect to a common axis. By way of example, the projection can be displaceable relative to the receptacle along the common axis.

In particular, the first locking element is rotatable relative to the second locking element about the common axis.

Advantageously, the first connecting part and the second connecting part are configured to be pivotable relative to one another about the axis. Preferably, this in particular gives the possibility of pivoting the cleaning carts relative to one another about the axis. This provides better negotiation of uneven ground surfaces, thresholds and/or ramps by the connected cleaning carts. In particular, here, the pivot axis is defined by the two locking elements.

Preferably, the axis is configured transversely and in particular perpendicularly to the connecting direction, specifically in the transverse direction.

Preferably, the axis is oriented parallel to a contact plane defined by rollers of the cleaning carts for supporting same on the ground surface. In particular, here, this can be a horizontal axis when the ground surface is oriented horizontally.

In a preferred embodiment, the locking elements are oriented transversely and in particular perpendicularly to the connecting direction, specifically the transverse direction. For example, here, the projection can engage in the receptacle in the transverse direction.

It proves to be advantageous for a projection region of one connecting part and a base region of the other connecting part to form corresponding contact elements, wherein the projection region, at an end face thereof, is in contact against the base region. This gives the possibility of obtaining a reliable relative positioning of the connecting parts along the connecting direction. Here, the projection region, at a contact element on an end face thereof that faces away from the base region of the same connecting part, can be in contact against the contact element of the base region of the respective other connecting part.

Preferably, a respective projection region and the base region of the respective other connecting part form corresponding contact elements. In this way, each projection region can be in contact against the base region of the respective other connecting part.

It is advantageous for the contact elements to form corresponding bearing elements when the connecting parts are pivoted relative to one another. In this way, pivoting movement of the connecting parts relative to one another can be guided and reliably effected. For example, the contact element forms a bearing shell at the base region, and the projection region forms a bearing projection, or vice versa. For example, provision can be made for the bearing shell and the bearing projection to be of the shape of the curved surface of a cylinder.

Advantageously, when the connecting parts are connected to one another, the first locking element can be brought into engagement with the second locking element automatically to assume the locking position. In this way, connection of the connecting parts can occur without a user needing to take further action, and the handling of the connection device can be improved.

It is advantageous for the connection device to comprise a biasing element and for the first locking element to be biased in a direction towards the locking position via the biasing element. The first locking element thereby assumes the locking position in the absence of an additional force, to enable secure connection of the connecting parts to one another.

Advantageously, stops for the biasing element are arranged or formed at the projection region and at the first locking element.

Preferably, the biasing element can be configured as a spring element which surrounds the first locking element configured as a locking pin in sections thereof and is supported on the latter and on the first projection region. As an example, the spring element is configured as a helical spring and is preferably configured as a compression spring.

It can be advantageous for the first locking element to comprise, preferably at an end face thereof, a slide element with which the second projection region mechanically con- tacts when the connecting parts are connected and thereby displaces the first locking element into the unlocking posi- tion against the action of the biasing element. This facilitates connecting the connecting parts to one another. The first locking element is transferred to the unlocking position. When the connecting parts are properly positioned relative to one another, the locking element, under the action of the biasing element, can be brought into engagement with the second locking element for automatic locking therewith.

By way of example, the slide element can be or comprise a slide face.

The locking elements are preferably captively held to the first projection region and the second projection region.

It is advantageous for a support element to be arranged at at least one of the connecting parts and for the projection region of the respective other connecting part to be arranged between the projection region of the former connecting part and the support element. In a direction transverse and in particular perpendicular to the connecting direction, the projection regions are arranged laterally side by side, wherein the projection region of at least one connecting part is arranged between the projection region of the other connecting part and the support element arranged at that connecting part. Preferably, the projection region arranged in the intermediate space can be secured against movement transverse and in particular perpendicular to the connecting direction, away from the other projection region, at least to the extent that the locking elements will not come out of engagement.

At least one such support element can be arranged at each of the two connecting parts.

By way of example, the support element projects from the base region of the connecting part in a direction towards the respective other connecting part.

By way of example, the support element is of disk-shaped or web-shaped configuration.

An intermediate space between the projection region and the support element of the connecting part comprising the two is preferably configured with the same or substantially the same width as the projection region of the respective other connecting part that engages in that intermediate space. For example, the projection region engages in the intermediate space in a form-locking manner when the connecting parts are connected to one another.

Preferably, when the connecting parts are connected to one another, the support element can form a guide element for the projection region engaging in the intermediate space in order to facilitate connection of the connecting parts to one another.

For example, in a preferred embodiment of the connection device in accordance with the invention, provision is made for the second projection region of the second connecting part to engage in the intermediate space between the first projection region of the first connecting part and a support element arranged thereat.

Alternatively or in addition, provision can be made for a support element to be arranged at the second connecting part and for the first projection region of the first connecting part to engage in an intermediate space between this support element and the second projection region.

Preferably, the connection device comprises a release element operatively connected to the first locking element, wherein the first locking element can be transferred from the locking position to the unlocking position by way of the release element. Preferably, the release element can be actuated by the user to transfer the locking elements to the unlocking position for releasing the cleaning carts from one another.

Advantageously, the release element can be actuated by hand and/or without tools.

The release element is preferably movably and in par- ticular displaceably supported on the first projection region. In this way, reliable functioning of the connection device can be ensured.

It is advantageous for the release element to be displace- able transversely and in particular perpendicularly to a displacement direction of the first locking element in order to transfer the first locking element to the unlocking posi- tion. For example, the direction of movement of the release element is oriented transversely and in particular perpen- dicularly to the connecting direction. Alternatively or in addition, the direction of movement can be oriented trans- versely and in particular perpendicularly to the transverse direction. For example, the direction of movement is ori- ented transversely and in particular perpendicularly to the contact plane defined by the rollers of the cleaning cart and in particular in a height direction.

Preferably, the release element and the first locking ele- ment comprise cooperating slide elements and are, via these, in contact one against the other. The respective slide ele- ments are preferably oriented at an incline to a respective displacement direction of the first locking element and the release element. The locking element can be displaced upon movement of the release element, wherein the force is transmitted via the slide elements.

By way of example, the slide elements are or comprise slide faces.

The release element, for user-friendly actuation thereof, can comprise for example a pushbutton where pressing the pushbutton causes the first locking element to be transferred from the locking position to the unlocking position. For example, in a preferred embodiment, the pushbutton is to be operated from above and pressed in a direction towards the ground surface.

In an embodiment with simple structure, the release element is pin-shaped.

Preferably, the release element is configured to assume a release position in which the first locking element assumes the unlocking position, and a neutral position in which the first locking element assumes the locking position. For example, the release element is actuated in the neutral position, whereby the first locking element is moved, and in particular displaced, from the locking position to the unlocking position. By such actuation, the release element is transferred from the neutral position to the release position.

In a preferred embodiment, provision can be made for the first locking element to be able to also assume the unlocking position in the neutral position of the release element. For example, provision is made for the first locking element to be movable, and in particular displaceable, from the locking position to the unlocking position, while the release element remains in the neutral position. For example, for transfer from the neutral position to the release position the release element is moved downwards in a direction towards the ground surface, and, conversely, in the upward direction for transfer from the release position to the neutral position.

In a preferred embodiment, a contact element for the release element assuming the release position is arranged or formed at the second projection region, wherein, when the connecting parts are connected, the contact element mechanically contacts the release element and transfers same in a direction towards the neutral position. For example, if the release element assumes the release position, the first locking element can thereby be held in the unlocking position. When the connecting parts are connected to one another, the contact element can act upon the release element and transfer same in a direction towards the neutral position. The locking element can, for example, be transferred to the locking position, in particular under the action of the biasing element as described previously. In this way, automatic locking can preferably be achieved.

For example, the contact element is a projection projecting laterally from the second projection region.

For example, the release element in the release position passes through the first projection region and engages in a recess formed at the first projection region, wherein the recess receives the contact element when the connecting parts are connected.

Provision can be made for a through-opening to be formed at the first projection region and/or at the second projection region for passing a cleaning tool therethrough. For example, the through-opening is provided to receive a handle of a hand-guided cleaning tool. The cleaning tool is, for example, a flat mop, a wiping mop or a broom. The through-opening can have a round cross section, for example.

As has been described above, the first connecting part comprises a first projection region and the second connecting part comprises the second projection region.

In a preferred embodiment of the connection device in accordance with the invention, it is advantageous for the first connecting part and the second connecting part each to comprise two projection regions, wherein the first projection region and the first locking element are arranged at the first connecting part and the second projection region and the second locking element are arranged at the second connecting part, and wherein a third projection region and a third locking element are arranged at the first connecting part and a fourth projection region and a fourth locking element are arranged at the second connecting part. By the additional locking elements (third and fourth locking elements), a more reliable connection between the connecting parts can be realized. In particular, here, provision is made for the third and the fourth locking element to be in engagement with one another when in a locking position and to be out of engagement when in an unlocking position, analogously as for the first and the second locking element.

Preferably, the third projection region is arranged laterally next to the fourth projection region, relative to a direction transverse and in particular perpendicular to the connecting direction (transverse direction).

For example, the second projection region and the third projection region are arranged between the first projection region and the fourth projection region, in a direction transverse and in particular perpendicular to the connecting direction (the transverse direction).

Preferably, two or more projection regions are arranged within a common plane. Advantageously, the plane is oriented parallel to a contact plane defined by the rollers of the cleaning cart.

It is particularly advantageous for the fourth projection region to be configured identically to the first projection region and/or for the third projection region to be configured identically to the second projection region.

Correspondingly, it is particularly advantageous for the fourth locking element to be configured identically to the first locking element and/or for the third locking element to be configured identically to the second locking element.

Advantageously, the base regions of the connecting parts are identically configured.

It is particularly preferred that the first connecting part and the second connecting part are configured as identical parts. The connection device can thereby be configured with simple structure. Manufacture is considerably simplified because of the savings in tools and costs. Operation of the connection device is considerably simplified for the user through the utilization of identical parts. The versatility of the cleaning system is enhanced. By way of example, each cleaning cart can be delivered with only one connecting part. By the use of identical parts, it can be ensured that two cleaning carts can always be connected to one another.

What has been said above with respect to the first and second projection regions and the first and second locking elements is applicable to the fourth and third projection regions and the fourth and third locking elements, respectively.

Advantageously, the first and the second locking element on the one hand and the fourth and third locking elements on the other hand define a common axis of all locking elements, about which axis the connecting parts can be pivotable relative to one another.

In particular, provision can be made for a further release element to exist which is associated with the fourth locking element in order to transfer same from the locking position to the unlocking position.

Preferably, what has been said above with respect to the further components of the connecting parts equally applies to both connecting parts. For example, the above-mentioned bearing elements and/or at least one support element is/are provided at each of the connecting parts.

In particular, the connecting parts in the connected state are configured to have symmetry about an axis oriented transversely and in particular perpendicularly to the connecting direction.

It can be provided that formed between a projection region of the first connecting part, for example the third projection region, and a projection region of the second connecting part, for example the second projection region, is a pass-through region which is at least partially enclosed by the base regions and the two said projection regions. For example, cleaning utensils, such as manually guided cleaning tools, can be arranged in the pass-through region.

Preferably, arranged at at least one of the connecting parts is a receiving element for attaching a clamping holder for cleaning utensils. For example, here, a clamping holder having a substantially C-shaped holding part is used at which an elastically deformable clamping part is arranged. The clamping part, under deformation thereof, can engage around the cleaning utensil and clampingly hold same. The cleaning utensil can be removed from the clamping holder under expansion of the clamping part.

The clamping holder can be fixable to the receiving element by way of a push-and-twist connection for example.

The clamping holder can be a constituent of the connection device and/or a constituent of the cleaning system.

As has been mentioned at the outset, the present invention further relates to a cleaning system.

A cleaning system in accordance with the invention, which solves the above-mentioned problem, comprises a first cleaning cart and a second cleaning cart, which are each configured for receiving cleaning utensils and comprise rollers for moving on a ground surface, wherein preferably at least one cleaning cart is hand-guided by way of a handle device, wherein the cleaning system comprises a connection device of the type as described above, wherein the first connecting part is fixed or fixable to the first cleaning cart and wherein the second connecting part is fixed or fixable to the second cleaning cart.

The advantages that have already been mentioned in the context of the description of the connection device in accordance with the invention can also be achieved with the cleaning system in accordance with the invention. In this respect, reference may be had to what has been described in the foregoing.

Advantageous embodiments of the cleaning system in accordance with the invention result from advantageous embodiments of the connection device in accordance with the invention. In this respect, reference may be had to what has been described in the foregoing.

The cleaning system can comprise more than two cleaning carts.

In particular, the respective connecting part is fixed or fixable to the cleaning cart via the base region. The projection region projects from the base region in a direction towards the respective other cleaning cart.

Preferably, arranged or formed at at least one cleaning cart is at least one receiving part at which coupling elements are arranged which cooperate with coupling elements, configured correspondingly thereto, of at least one connecting part, for releasably connecting the connecting part to the cleaning cart. The possibility of releasably fixing the connecting part to the cleaning cart is advantageous. The connecting part can be removed if it is not required to connect the cleaning cart to another cleaning cart. For example, in lieu of the connecting part, a different functional device can be attached to the cleaning cart. For example, a functional device for receiving cleaning utensils is conceivable. The releasable connection can be ensured via the corresponding coupling elements.

Preferably, the connecting part can be connected to the cleaning cart by hand and/or without tools.

For example, the coupling elements can cooperate by a force-locking and/or form-locking connection.

Provision can be made for the coupling elements to comprise or form latching elements and/or clamping elements.

It is advantageous for two or more receiving parts to be arranged or formed at different positions on the cleaning cart and for the connecting part to be selectively connectable to one of the receiving parts. In this way, the cleaning system is rendered highly versatile. The user can attach the connecting part to the cleaning cart at the position that is best suited to the user's requirements.

Advantageously, if the cleaning cart comprises two or more receiving parts, the possibility exists for the cleaning cart to be connected to two or more further cleaning carts. This can be advantageous not only while performing work with the cleaning carts but also when performing preparatory work steps or when doing follow-up work after completing the cleaning.

Preferably, the two or more receiving parts are of identical configuration.

For example, the cleaning cart comprises a frame having a frame lower part to which the rollers are held, and having at least one frame upper part arranged above the frame lower part and arranged a distance apart from the frame lower part. Provision can be made for at least one receiving part to be arranged or formed at the frame upper part and/or for at least one receiving part to be arranged or formed at the frame lower part. This gives the possibility of selectively attaching the connecting part at the bottom or at the top of the frame.

For example, having connecting parts arranged at the top of the frame is advantageous in that this facilitates the interconnection of the cleaning carts by a user because the user has a good view of the connecting parts. In a corresponding manner, if a release element is provided, the connecting parts can be separated from one another in an easy-to-handle way.

For example, if a through-opening for a cleaning tool, a pass-through region for a cleaning tool and/or a clamping holder for cleaning utensils is provided, this will facilitate the carrying along of cleaning tools or cleaning utensils by a user when the connecting part is arranged at the top of the frame.

Positional and orientational terms, such as "bottom", or "top", or the like relate to the intended use of the cleaning system, already mentioned, in which the cleaning cart is supported on the ground surface via its rollers arranged at the bottom thereof.

Provision can be made for two or more receiving parts to be arranged at the frame upper part and/or at the frame lower part, and for two receiving parts to be arranged at the frame upper part and/or at the frame lower part on sides of the frame that face away from one another and/or on two sides of the frame adjacent to one another at an angle. This increases the versatility of the cleaning system. The two sides of the cleaning cart are oriented at right angles to one another for example.

Preferably, at least one receiving part is arranged or formed at each cleaning cart. In particular, preferably one of connecting parts can be releasably fixable to each cleaning cart.

The receiving parts of different cleaning carts are preferably of identical configuration. For example, this gives the possibility of having each connecting part fixable to each cleaning cart.

Figure 2:
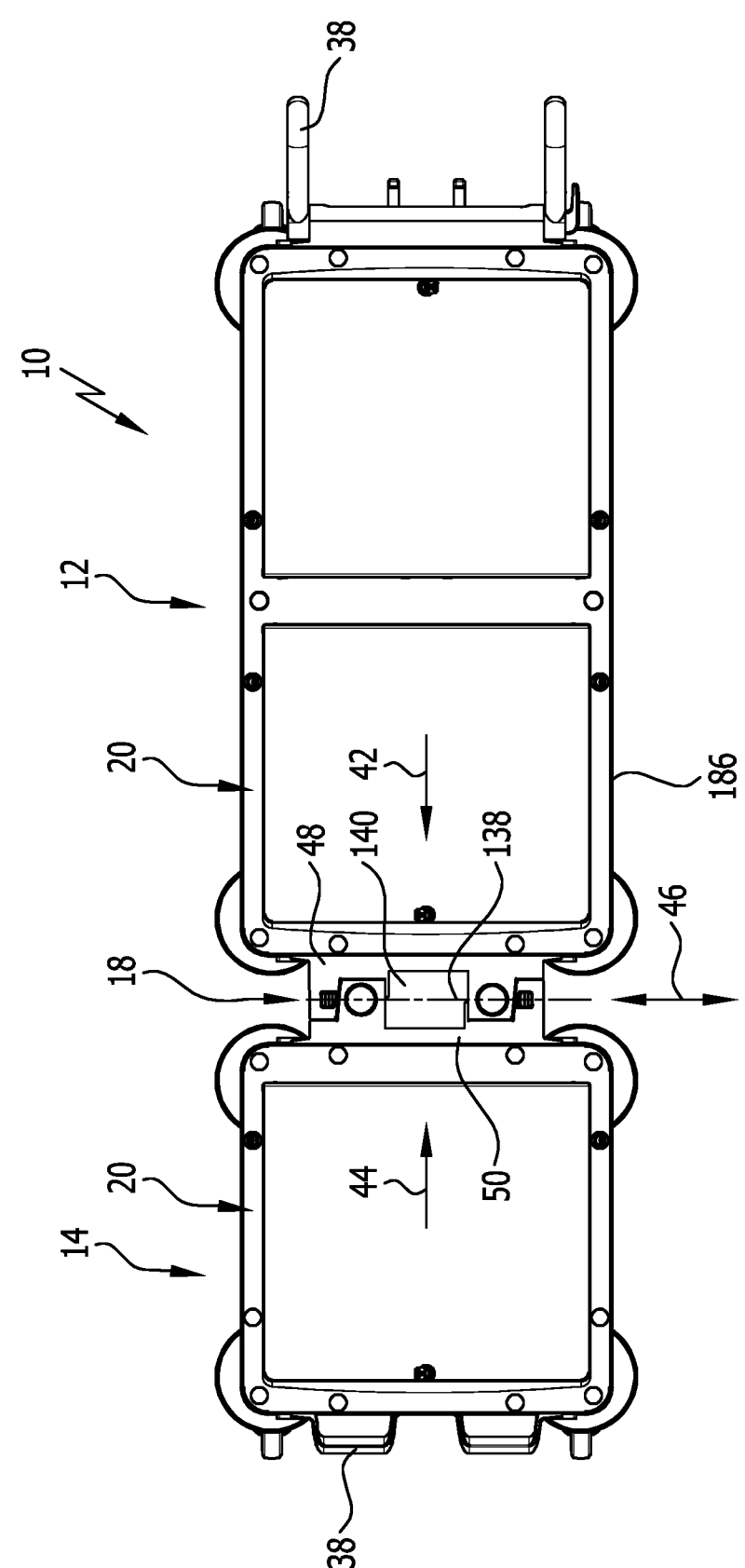
FIG. 2 illustrates a top plan view of the cleaning system of FIG. 1.
Figure 3:
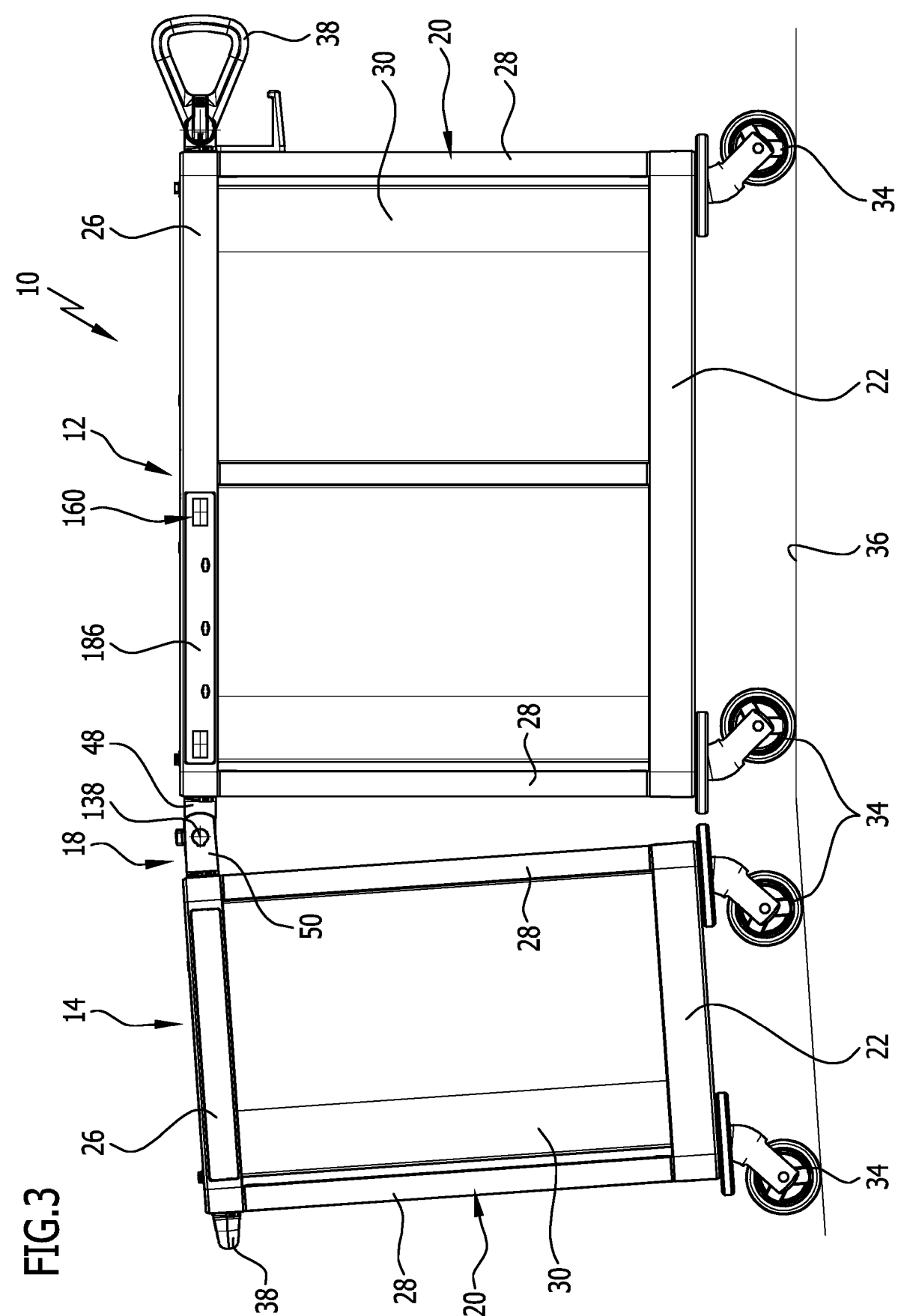
FIG. 3 illustrates a side view of the cleaning system of FIG. 1, wherein the cleaning carts are pivoted relative to one another.
Figure 17:
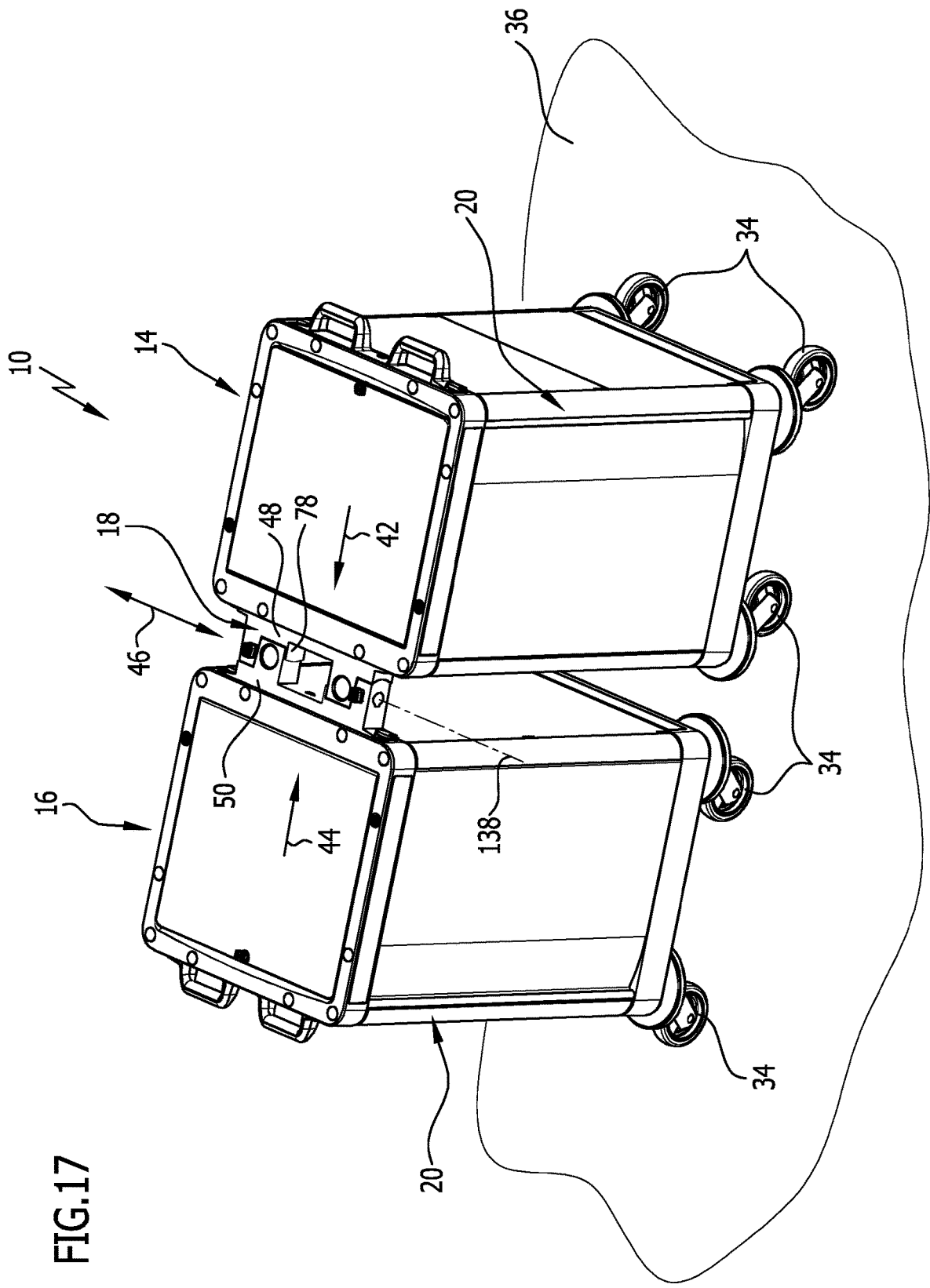
FIG. 17 illustrates, in a perspective representation, two cleaning carts of the cleaning system and a connection device via which the cleaning carts are interconnected.

FIGS. 1 to 3 show a partial representation of a cleaning system in a preferred embodiment, generally designated by the reference numeral 10. The cleaning system 10 comprises a cleaning cart 12 and a cleaning cart 14. Furthermore, the cleaning system 10 can comprise further cleaning carts. Of these, a cleaning cart 16 which in the present case is of identical configuration to the cleaning cart 14 is illustrated in FIG. 17 as an example. It is understood that the cleaning carts can be configured differently.

The cleaning system 10 further comprises a preferred embodiment of the connection device 18 in accordance with the invention for connecting two cleaning carts. In particular, here, a releasable connection of the cleaning carts is possible.

As can be seen from FIGS. 1 to 3 and 17 in particular, the cleaning carts 12 to 16 comprise in particular a frame 20, in particular wherein this can also be understood to mean a corpus or a rack. The frame 20 comprises a frame lower part 22 and a frame upper part 26 spaced apart relative thereto in a height direction 24. The frame lower part 22 and the frame upper part 26 are connected to one another by way of profile parts 28. The frame 20 can comprise side walls and/or doors 30 so that a substantially closed corpus results. The frame 20 can comprise a top wall 32 on an upper side thereof.

On the frame lower part 22, rollers 34 are arranged on each cleaning cart 12 to 16. The cleaning cart can be moved on a ground surface 36 via the rollers 34, which can be rigid rollers or steered rollers. The cleaning carts 12 to 16 are hand-guided by a user not illustrated in the drawing. To guide the cleaning carts 12 to 16, they preferably each comprise a handle device 38 fixed to the frame 20, which handle devices 38 can be provided in different configurations.

The cleaning carts 12 to 16 serve to receive cleaning utensils, not shown in the drawing, examples of which include hand-guided cleaning machines, cleaning tools, receptacles for cleaning accessories, waste, cleaning cloths, etc.

Positional and orientational terms as used herein are to be understood to relate to an intended use of the cleaning cart 10 and the connection device 18. Here, the respective cleaning cart 12 to 16 is supported on the ground surface 36 via its rollers 34. In a non-limiting, simplified assumption, the ground surface 36 can be assumed to be horizontally oriented. When in intended use, a contact plane defined by the rollers 34 coincides with the plane defined by the ground surface 36.

Two of the cleaning carts 12 to 16 can be connected to one another via the connection device 18. This will be explained in the following using the example of cleaning carts 12 and 14. What is stated in connection with the cleaning cart 12 applies analogously to the cleaning cart 16 of FIG. 17 and therefore will not be discussed separately herein.

In order to connect the cleaning carts 12 and 14, provision is made for them to be approximated to one another and to be connected to one another in a desired connecting direction 40. The connecting direction 40 is indicated in the drawing by a double arrow (FIGS. 5 to 7 and 10). In FIGS. 1, 2 and 17, the designated connecting direction 40 is symbolized by two arrows 42, 44, wherein these arrows 42, 44 indicate the direction in which a respective cleaning cart 12 and 16 or 14 is to be moved for connection thereof to the respective other cleaning cart.

The connecting direction 40 in the present case is oriented parallel to the contact plane of the rollers 34 and transversely and in particular perpendicularly to the height direction 24.

A transverse direction 46, indicated by a double arrow, is oriented transversely and in particular perpendicularly to the connecting direction 40 and is itself oriented transversely and in particular perpendicularly to the height direction 24. Correspondingly, the height direction 24, the connecting direction 40 and the transverse direction 46 are preferably pairwise perpendicular to one another.

The connection device 18 comprises a first connecting part 48 and a second connecting part 50. The connecting parts 48, 50 can be releasably connected to one another.

Each connecting part 48, 50 can be releasably fixed to one of the cleaning carts 12, 16. This will be explained in the following.

In the preferred connection device 18, the connecting parts 48, 50 are configured as identical parts. This affords the advantage of simplified manufacture with reduced manufacturing costs. Utilization of identical parts significantly simplifies the handling for a user. The connection device 18 has proven to be compatible with cleaning carts of different types, thus rendering the cleaning system 10 highly versatile.

Because of the identical configuration of the connecting parts 48, 50, only the connecting part 48 is discussed in the following. What is said in connection with the connecting part 48 applies analogously to the connecting part 50. Identical reference numerals are used to refer to the same components. What has been said in the foregoing concerning the nomenclature of the cooperating components will subsequently be explained.

As can be seen from FIGS. 4 to 7 and 10 to 13 in particular, the connecting part 48 comprises a base region 52 that faces towards the cleaning cart 12, and projection regions 54 and 56 projecting from the base region 52 in a direction towards the other connecting part 50.

The base region 52 comprises a substantially plate-shaped section 58 which is in contact against the cleaning cart 12, and a socket section 60 raised therefrom. The projection regions 54, 56 here project from the socket section 60. The projection regions 54 and 56 are spaced apart from one another in the transverse direction 46.

The connecting part 48 has a first end section 62 and, opposite thereto, a second end section 64, relative to the transverse direction 46. The socket section 60 extends between the end sections 62, 64.

The projection region 54 in the present example is arranged proximate the end section 62. A first side face 66 that faces towards the end section 62 is oriented substantially perpendicularly to a plane of the plate-shaped section 58.

The projection region 54 has a contact element 68 at an end face thereof. The contact element 68 comprises a radius resulting in a convex configuration having a substantially cylindrical curvature.

Further in the transverse direction 46, the projection region 54 has a contact element 70. A plane of the contact element 70 is inclined with respect to the designated connecting direction 40. The projection region 54 thereby has, in the area of the contact element 70, a taper starting from the base region 52 in a direction towards the connecting part 50 (FIGS. 4 and 5).

The projection region 54 has a recess 72 arranged at a bottom side thereof. The recess 72 is positioned between a lower wall 74 and the contact element 70.

Figure 4:
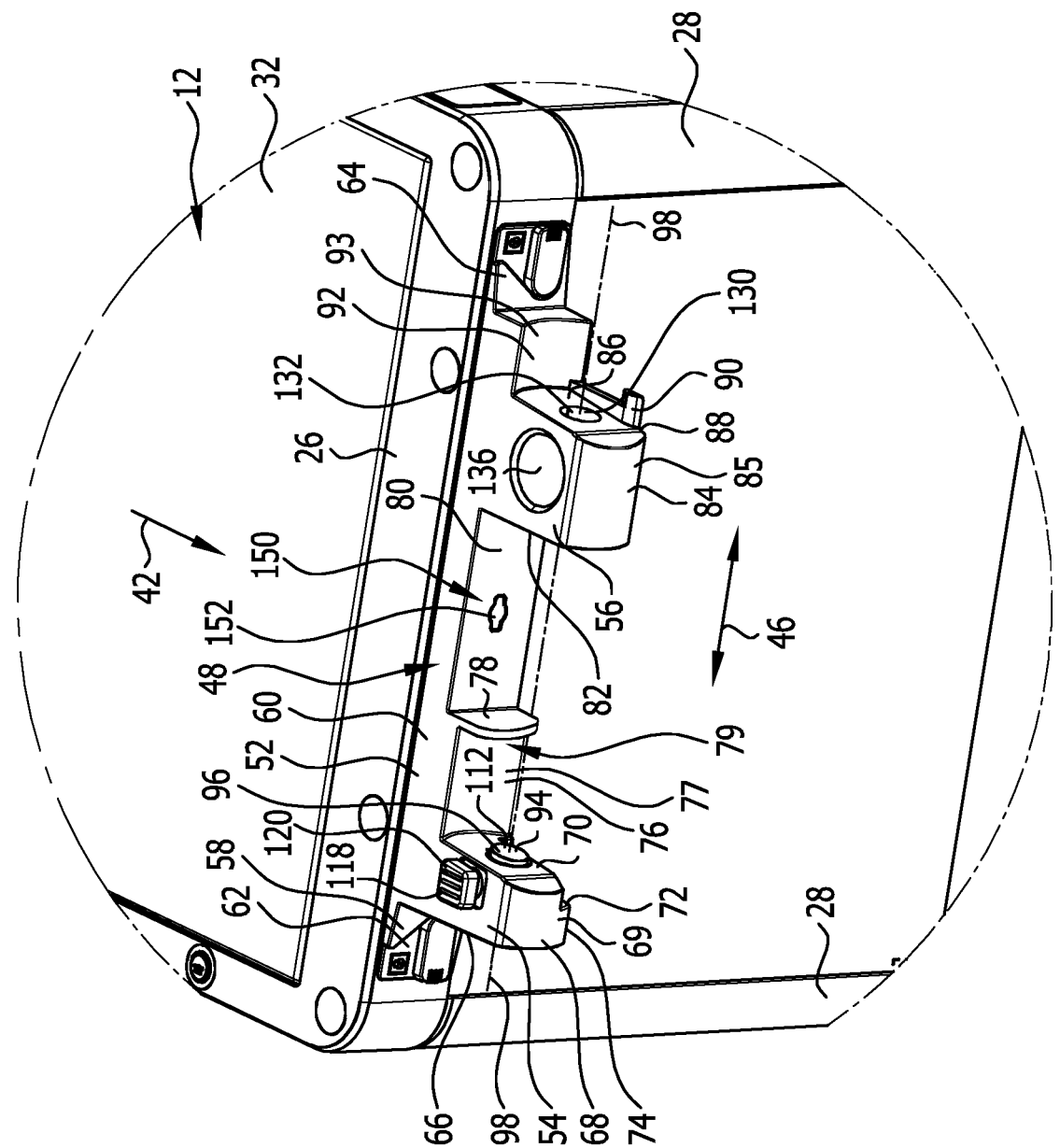
FIG. 4 illustrates a perspective partial representation of a cleaning cart of the cleaning system of FIG. 1 and a connecting part of the connection device.
Figure 5:
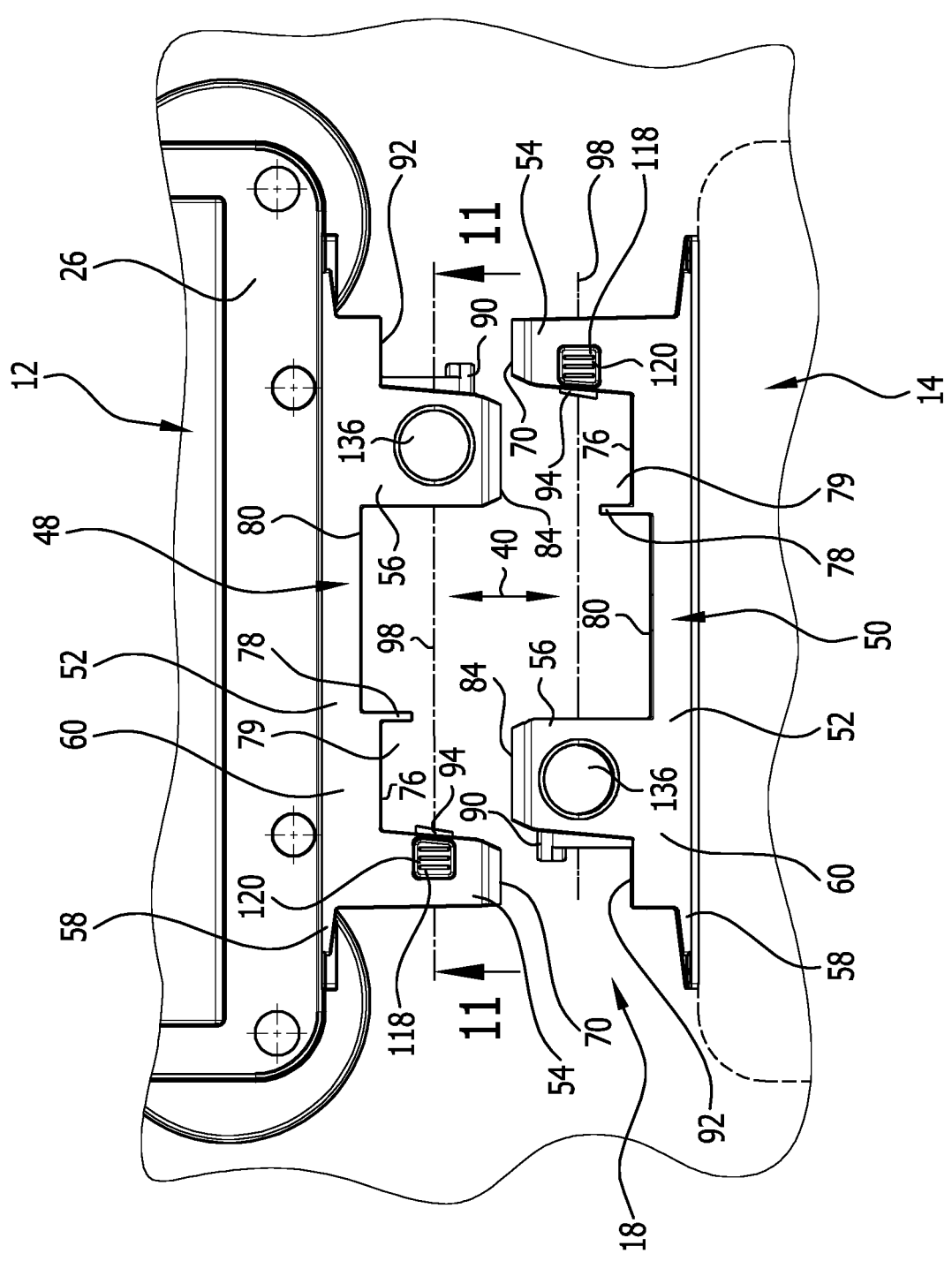
FIG. 5 illustrates a top plan view corresponding to the detailed representation of FIG. 4 but additionally showing, in partial representation, a further connecting part of the connection device, the other cleaning cart being indicated in outline only in the interest of clarity.

Adjoining the contact element 70 in the transverse direction 46 is a contact element 76 at the base region 52 (FIG. 4). The contact element 76 has a radius. In the present example, the contact element 76 is of concave configuration having a substantially cylindrical curvature.

Further in the transverse direction 46 in a direction towards the projection region 56, the contact element 76 is adjoined by a support element 78. The support element 78 is a projection at the connecting part 48 that projects from the base region 52 in a direction towards the other connecting part 50. In the present example, the extension of the support element 78 in a direction towards the connecting part 50 is less than the extension of the projection region 54 and is, for example, about one-quarter to three-quarters of the extension of the projection region 54.

In the present example, the support element 78 is disk-shaped and has a curvature that faces away from the base region 52. However, the support element 78 could also take a different form.

Formed between the support element 78 and the projection region 54 is an intermediate space 79.

Further in the transverse direction in a direction towards the projection region 56, the support element 78 is succeeded by a substantially planar end face 80 of the socket section 60.

Adjoining the end face 80 in a direction towards the end section 64 is the projection region 56 which has, located first in the transverse direction 46, a side face 82. The side face 82 is oriented substantially perpendicularly to the plane of the plate-shaped section 58.

Adjacent to the side face 82 in the transverse direction 46, the projection region 56 has a contact element 84 at an end face thereof. The contact element 84 comprises a radius. In the present example, the contact element 84 is of convex configuration having a substantially cylindrical curvature.

Adjoining the contact element 84 in the transverse direction 46 is a contact element 86 at the projection region 56. The plane of the contact element 86 is of inclined configuration relative to the designated connecting direction 40. The projection region 56 thereby has, in the area of the contact element 86, a taper starting from the base region 52 in a direction towards the other connecting part 50, (FIGS. 4 and 5).

In particular, the contact elements 70 and 86 at the projection regions 54 and 56, respectively, have identical inclinations. Correspondingly, the projection regions 54, 56 have identical degrees of taper.

Starting from a lower wall 88 of the projection region 56, a contact element 90 projects from the projection region 56 in the transverse direction 46 in a direction towards the end region 64. The contact element 90 is an approximately strip-like projection whose shape conforms to the shape of the recess 72 of the projection region 54.

Further in the transverse direction 46, the projection region 56 is adjoined by a contact element 92 at the base region 52. The contact element 92 has a radius. In the present example, the contact element 92 is of concave configuration having a substantially cylindrical curvature.

The contact elements 68 and 92 at the projection region 54 and at the base region 52, respectively, conform to one another in size, and shape, and in particular curvature. They form corresponding bearing elements 69 and 93, respectively, when the connecting parts 48, 50 are connected to one another.

The contact elements 76 and 84 at the base region 52 and the projection region 56, respectively, conform to one another in size and shape and in particular curvature. They form corresponding bearing elements 77 and 85, respectively, when the connecting parts 48, 50 are connected to one another.

In particular, the contact elements 76 and 92 which are of concave configuration form bearing shells. The contact elements 68 and 84 which are of convex configuration are bearing projections.

The contact elements 70 and 86 at the projection region 54 and at the projection region 56, respectively, conform to one another in size and shape in addition to their inclination with respect to the connecting direction 40.

In order to connect the connecting parts 48, 50 to one another, they each comprise locking elements. Here, a locking element at the connecting part 48 can cooperate with a corresponding locking element at the connecting part 50. Since the connecting parts 48, 50 are configured as identical parts, each connecting part 48, 50 has two locking elements. These two locking elements are explained taking as an example the first connecting part 48 just as it has been used as an example to describe the form of the connecting part 48.

As can be seen from FIGS. 4 and 10 to 13 in particular, a locking element 94 is arranged at the projection region 54. The locking element 94 is configured as a locking projection, in particular as a locking pin 96, which is supported for displacement on the projection region 54 along an axis 98 in the transverse direction 46.

In the present case, a sleeve 100 is provided for receiving the locking pin 96, which sleeve 100 can be formed in one piece with the projection region 54. An anti-rotation element 102 can be provided at the projection region 54 to prevent rotation of the sleeve 100 about the axis 98. Depending on the configuration of the sleeve 100, the need for the anti-rotation element 102 can be eliminated.

A biasing element 104 is provided at the projection region 54. The biasing element 104 is configured as a helical spring 106 which surrounds the locking pin 96 in sections thereof and is supported on stops 108 and 110 of the projection region 54 and the locking pin 96 respectively.

Figure 12:
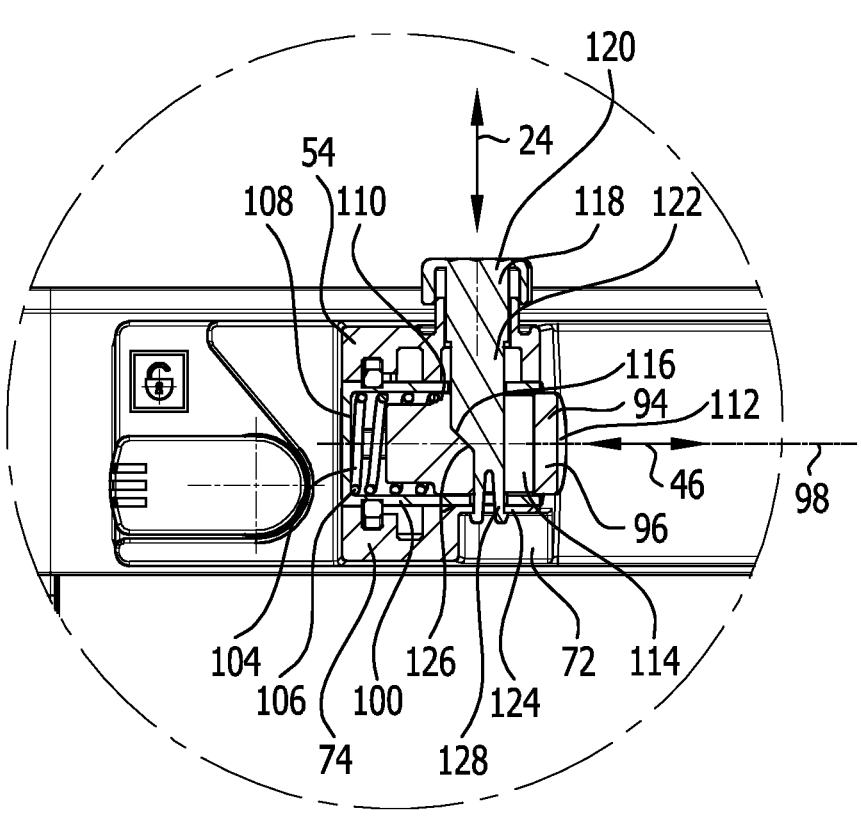
FIG. 12 illustrates an enlarged representation of detail A of FIG. 11.

The biasing element 104 is configured to bias the locking pin 96 in a direction towards a locking position. When in the locking position, the locking pin 96 protrudes from the sleeve 100 beyond the contact element 70 (FIG. 12).

Figure 13:
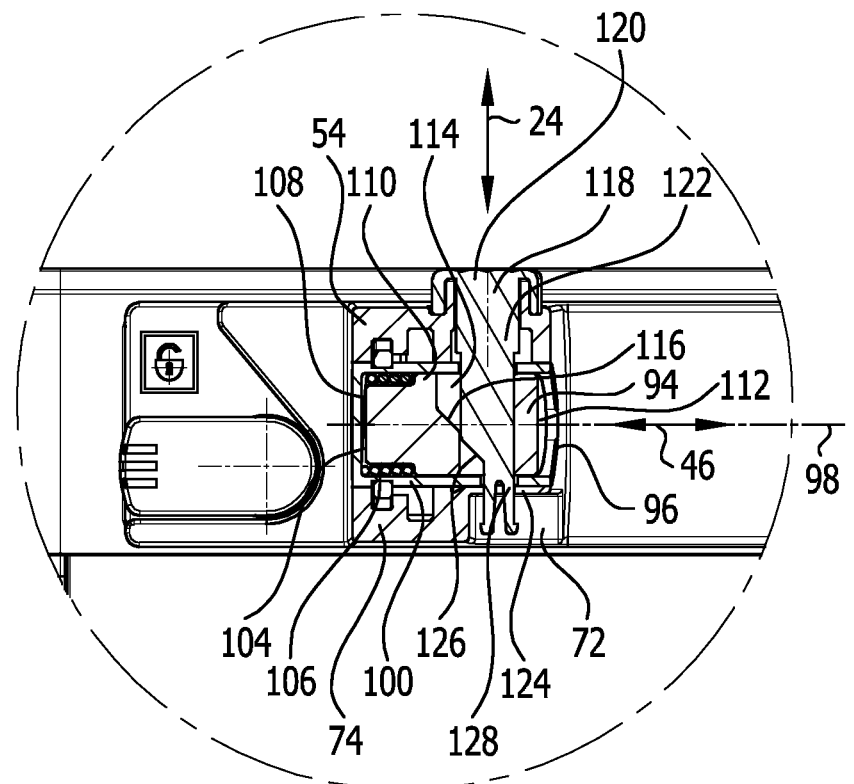
FIG. 13 illustrates a representation corresponding to FIG. 12, wherein a locking element and a release element of the connecting part assume different positions compared to FIG. 12.

The locking pin 96 can be transferred to an unlocking position against the action of the biasing element 104, in which unlocking position it is displaced into the sleeve 100 and does not project beyond the contact element 70 (FIG. 13). The direction of displacement is along the axis 98, in the present case the transverse direction 46.

The locking pin 96 has a slide element 112 at an end face thereof. The slide element 112 comprises a slide face which has an inclination relative to the designated connecting direction 40.

A through-opening 114 is formed in the locking pin 96. In the present case, the through-opening 114 extends in the height direction 24 (FIGS. 10 to 13).

At an edge of the through-opening 114, the locking pin 96 comprises a slide element 116, which in the present case comprises a slide face. The slide element 116 has an inclined configuration relative to the height direction 24 and relative to the transverse direction 46, preferably of about 45° in each case (FIGS. 12 and 13). The cross-sectional area of the through-opening 114 is reduced at the slide element 116, when viewed from a top-down direction.

The connection device 18 comprises a release element 118 associated with the locking pin 96. The release element 118 is of pin-shaped configuration and, in the present example, extends from top to bottom through the projection region 54 and the locking pin 96.

The release element 118 comprises, on an upper side thereof, a pushbutton 120 as an actuating element. Adjoining the pushbutton 120 in a downward direction is a section 122 which passes through the through-opening 114 of the locking pin 96 and an opening 124 of the projection region 56, wherein the opening 124 opens out into the recess 72 (FIGS. 12 and 13).

The section 122 comprises a slide element 126 configured to conform to the slide element 116 and comprising a slide face. The slide elements 116, 126 can cooperate with one another. The section 122 tapers from top to bottom in the area of the slide element 126.

The release element 118 has, at a bottom end thereof, a latching element 128 configured as a latching hook. The latching element 128 latches with an edge of the opening 124, whereby the release element 118 is captively held to the projection region 56.

This also provides the possibility of captively holding to the projection region 56 the locking pin 96 which has the release element 118 projecting therethrough.

The release element 118 is supported for displacement on the projection region 54 along the height direction 24.

The through-opening 114 of the locking pin 96 is dimensioned such that it is wider than the section 122 above the taper thereof. In particular, here, the locking pin 96 can be displaced transversely to the release element 118.

The release element 118 is configured to assume a neutral position as shown in FIG. 12. In the neutral position, the release element 118 is displaced upwardly as far as possible, and the latching element 128 is in contact against the edge of the opening 124. The slide elements 116, 126 are in contact against one another.

In the neutral position, the locking pin 96 can assume the locking position by the biasing element 104 displacing same as far as possible. The release element 118 forms the stop for the locking pin 96.

In the neutral position, the locking pin 96 can also be displaced to the unlocking position, against the action of the biasing element 104, because the through-opening 114 has a larger cross-sectional area than the section 122.

The release element 118 can be transferred from the neutral position to a release position by downward displacement thereof, for example by pressure actuation (FIG. 13). Here, the slide elements 116, 126 slide on one another and the locking pin 96 is displaced from the locking position to the unlocking position against the action of the biasing element 114. In the release position, the latching element 128 projects beyond the edge of the opening 124 and engages in the recess 72. The release element 118 forms a stop that holds the locking pin 96 in the unlocking position.

The release element 118 can be displaced, relative to the projection region 56, upwardly in a direction towards the neutral position by an upward force. As a result of this, the stop action for the locking pin 96 ceases to exist. The locking pin 96 is displaced again to the locking position under the action of the biasing element 104. Here, the slide elements 116, 126 can continue to cooperate in order to displace the release element 118 upwardly until it reaches the neutral position.

Figure 10:
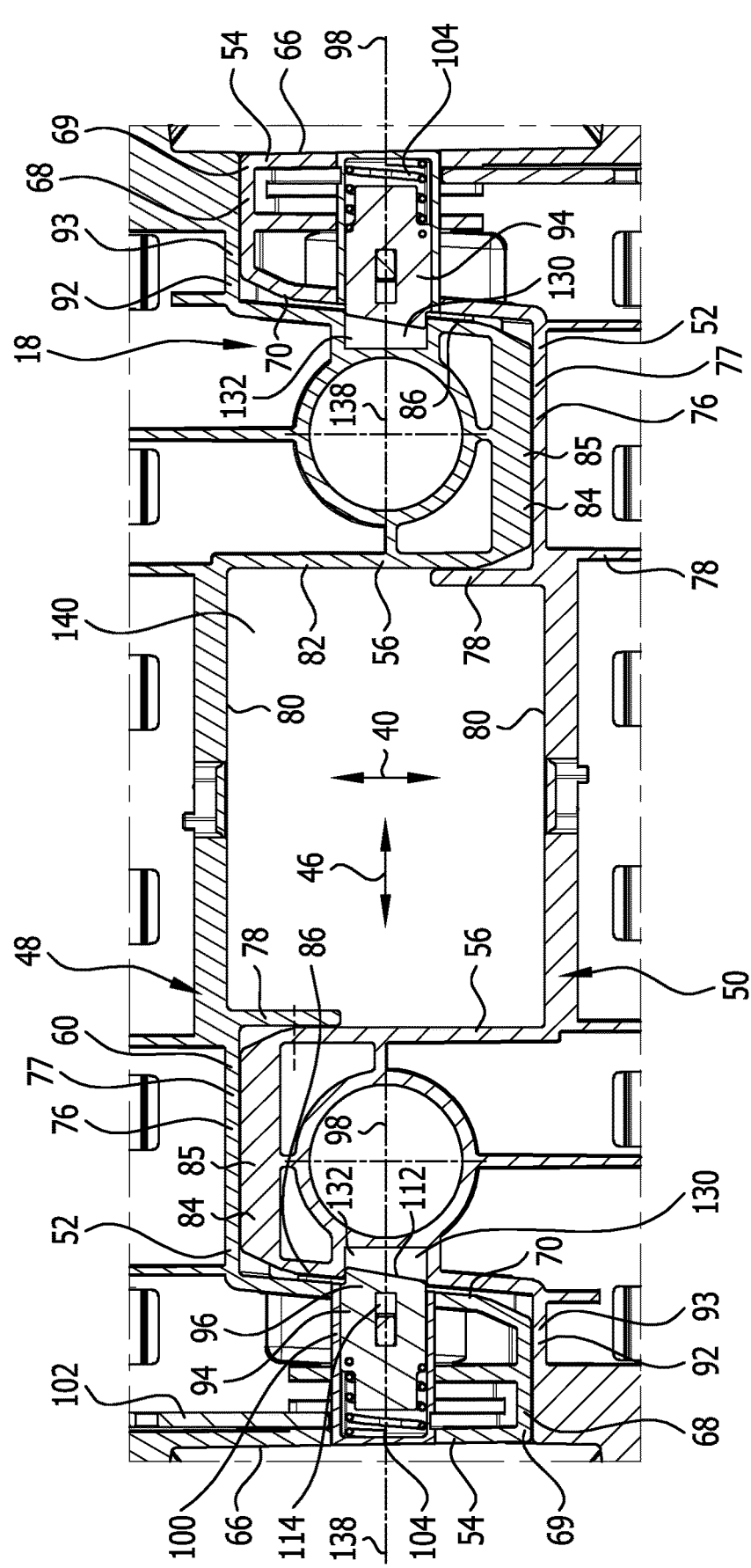
FIG. 10 illustrates a sectional view of the connection device in a connected state of the cleaning carts, wherein the section is taken along line 10-10 of FIG. 11.
Figure 11:
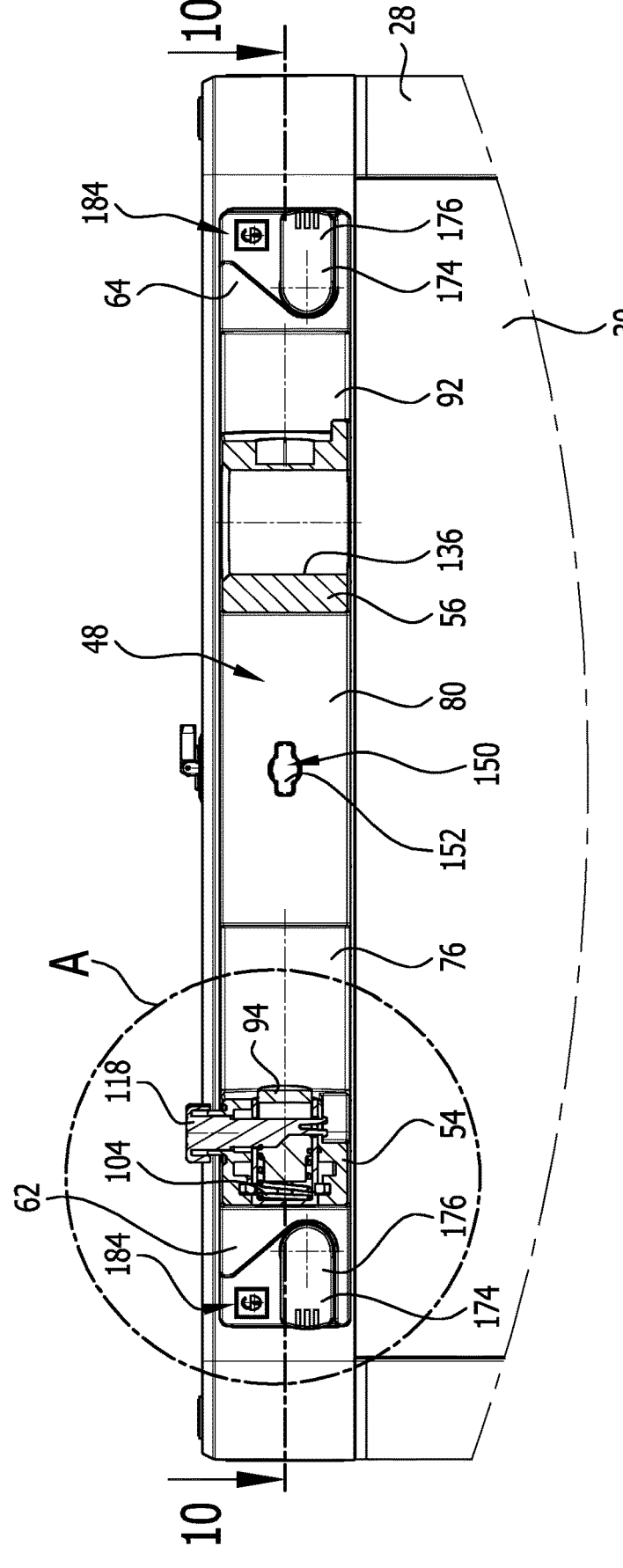
FIG. 11 illustrates a sectional representation of a connecting part taken along line 11-11 of FIG. 5.

As can be seen from FIG. 10 in particular, a locking element 130 is arranged at the projection region 56. The locking element 130 is a receptacle for the locking projection, in particular configured in the form of blind hole 132 which extends from the contact element 86.

The locking element 130 is configured with dimensions corresponding to those of the locking element 94 and can be in form-locking engagement with the locking element 94 (of the respective other connecting part 48, 50). Here, the locking pin 96 assuming the locking position can engage in the blind hole 132 in form-locking relation therewith. The locking pin 96 and the blind hole 132 in the present case have circular cross sections.

On the other hand, when the locking pin 96 assumes the unlocking position, it is arranged outside the blind hole 132.

The locking position of the locking pin 96 and the unlocking position thereof define a locking position and an unlocking position of cooperating locking elements 94, 130, respectively.

The locking element 130 defines an axis that is identical to the axis 98 in the connection state of the connecting parts 48, 50. Correspondingly, the locking elements 94 and 130 of the two connecting parts 48, 50 are oriented coaxially with one another when in the connection state.

In particular, the locking elements 94, 130 of the same connecting part 48, 50 are also oriented coaxially with one another.

Formed at the projection region 56 is a through-opening 136 which extends in the height direction 24. The through-opening 136 has, for example, a cylindrical cross section and serves to receive cleaning utensils. In particular, for example, the handle of a wiping mop, a flat mop or a broom can be passed through the through-opening 136.

In the following, interconnecting the cleaning carts 12, 14 will be discussed with reference first to FIGS. 5 to 7. Here, the cleaning carts 12, 14 are first assumed to be correctly oriented relative to one another along the desired connecting direction 40. In this case, the directions of both arrows 42, 44 are opposite to one another and are aligned with one another.

As shown in FIG. 5, the connecting parts 48, 50 initially are at a distance from one another. The cleaning carts 12, 14 are correctly positioned relative to one another in the transverse direction 46. For example, as shown, the locking pin 96 can assume the locking position and the release element 118 can assume the neutral position.

Figure 6:
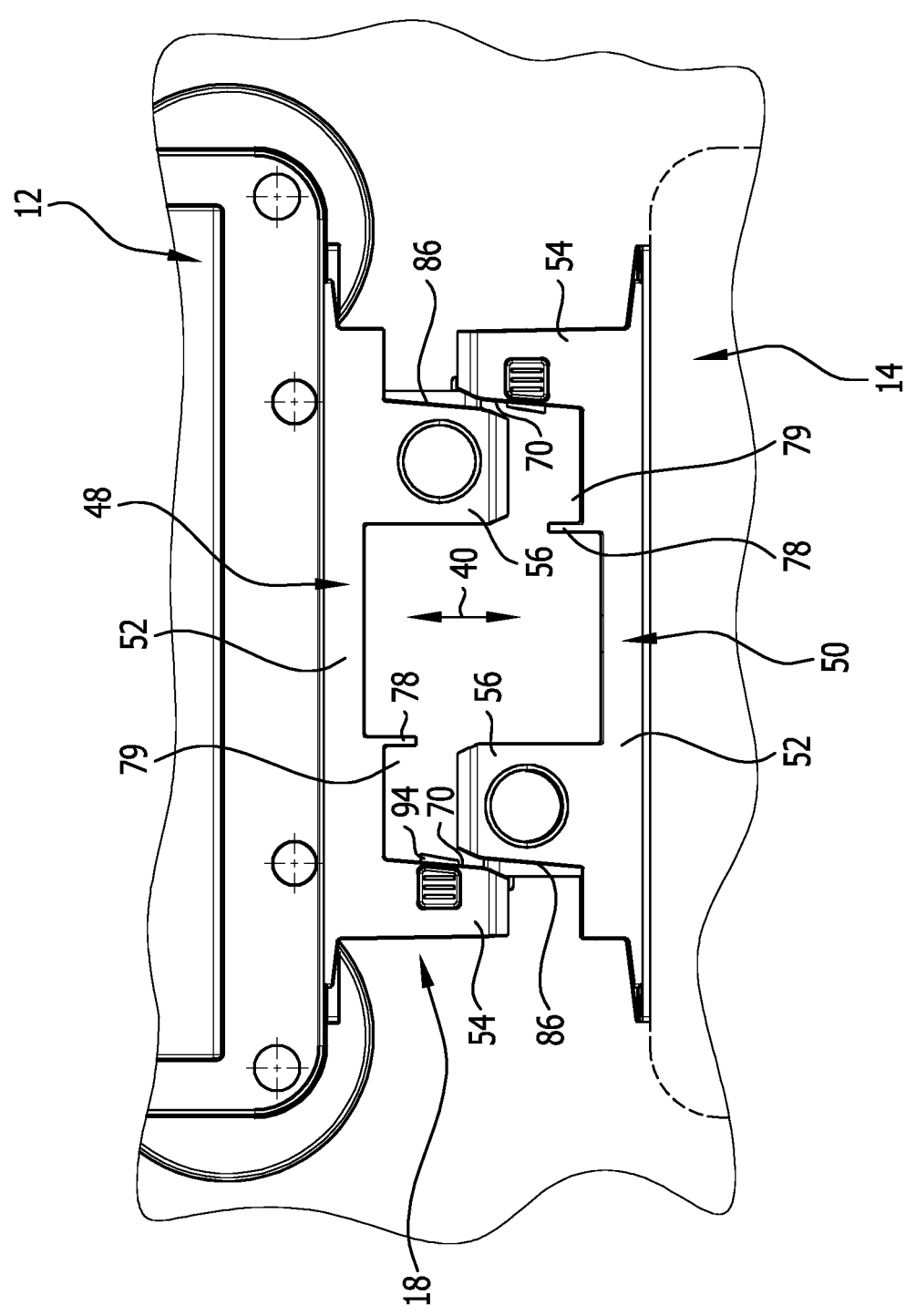
FIGS. 6 and 7 illustrate representations corresponding to FIG. 5, wherein the connecting parts are shown in positions in which they are approximated to one another.
Figure 7:
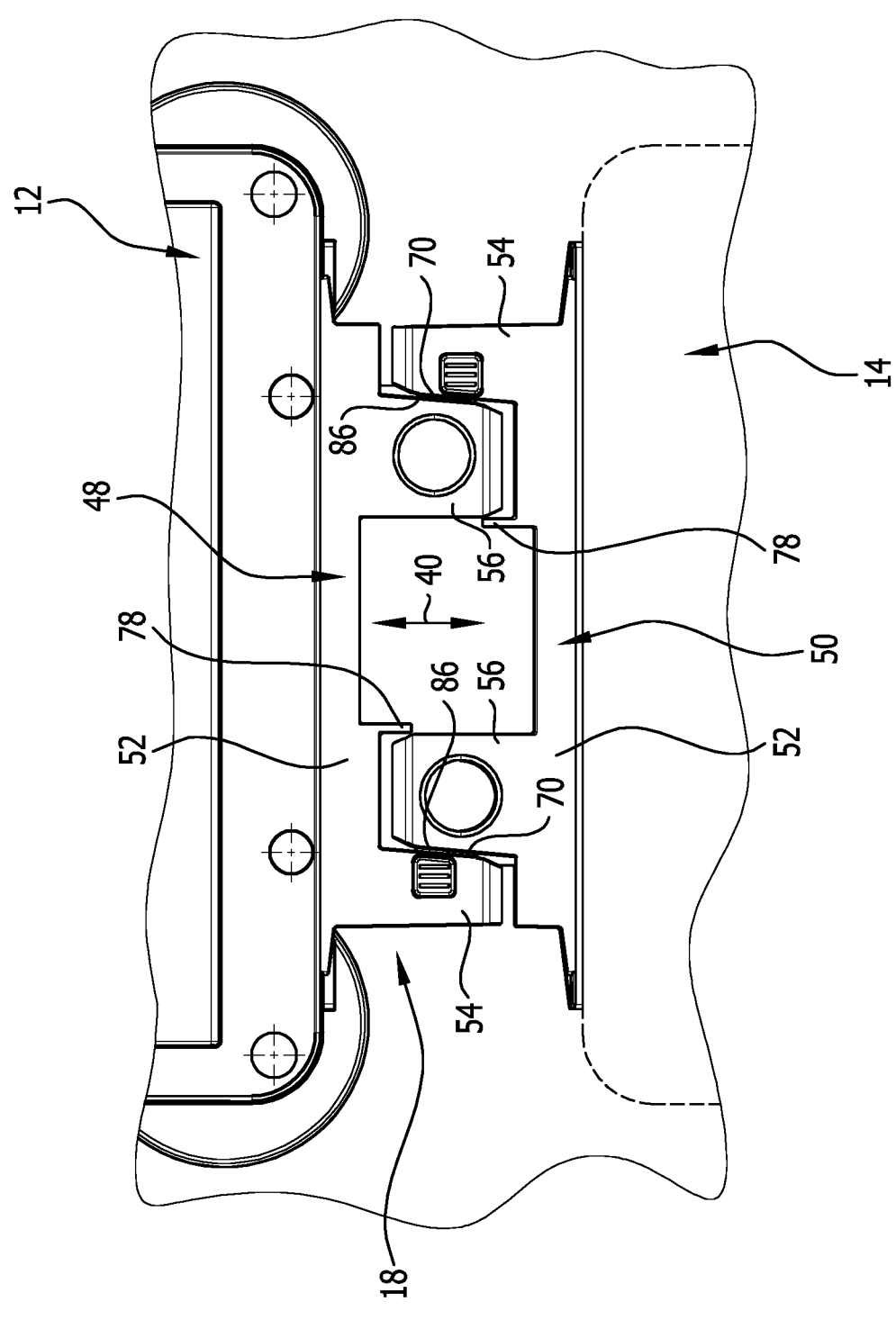

As the connecting parts 48, 50 are approximated to one another, the projection region 56 of one connecting part 48, 50 reaches the intermediate space 79 laterally next to the projection region 54 of the respective other connecting part 48, 50 (FIG. 6). Continued movement will cause the contact element 86 to contact the slide element 112 (FIG. 7). The locking pin 96 is thereby moved into the unlocking position. The connecting parts 48, 50 can be approximated further to one another.

Movement of the connecting parts 48, 50 is possible until the connecting parts 48, 50 come into contact against one another. Here, the contact elements 68 and 92 are in contact against one another, and the contact elements 76 and 84 are in contact against one another. At the same time, the locking element 130 at the projection region 56 of one connecting part 48, 50 is oriented in coaxial and side-by-side relation to the locking pin 96 at the projection region 54 of the other connecting part 48, 50. The locking pin 96 is transferred to the locking position under the action of the biasing element 104 and is in form-locking engagement with the blind hole 132 (FIG. 10). The two connecting parts 48, 50 are connected to one another.

In the connection state, the projection regions 54 and 56 are arranged directly laterally side by side to one another. The contact elements 70 and 86 are in contact against one another.

In the connection state, the projection region 56 engages in the intermediate space 79 and is arranged between the projection region 54 and the support element 78.

The support element 78 serves to support the projection region 56 so that same cannot move away from the projection region 54 in the transverse direction 46. This ensures that the locking elements 94, 130 remain in engagement with one another, thereby securing the connection of the connecting parts 48, 50.

By way of example, the projection region 56 can be contacted against the support element 78 via the side face 82 thereof.

As the connecting parts 48, 50 are approximated to one another, the support element 78 can act as a guide element for the projection region 56, whereby the connection of the connecting parts 48, 50 is facilitated.

It is advantageous that, by the lateral positioning of the locking elements 94, 130 and the coaxial orientation thereof with respect to one another, pivotable support of the connecting parts 48, 50 with one another is enabled. In particular, the locking elements 94 and the corresponding locking elements 130 form cooperating bearing elements.

In the connection state, the axis 98 defines a pivot axis 138. The pivot axis 138 is oriented parallel to the contact plane of the rollers 34, in particular horizontally.

The connecting parts 48, 50 are pivotable relative to one another about the pivot axis 138. In particular, the connecting parts 48, 50 are supported for pivotal movement one on the other. Here, the bearing elements 69 and 93 and the bearing elements 77 and 85, respectively, cooperate with one another.

Thus, via the connecting parts 48, 50, the connected cleaning carts 12, 14 are pivotable relative to one another about the pivot axis 138. This is advantageous for moving over uneven ground, thresholds or, for example, up and down ramps (FIG. 3).

It is apparent from the above description that the connection device 18 is self-locking via the locking elements 94, 130.

In the case in which, when the connecting parts 48, 50 are connected, the release element 118 assumes the release position and the locking pin 96 assumes the unlocking position—corresponding to what is shown in FIG. 13—self-locking can be achieved as well. The contact element 90 of the projection region 56 engages in the recess 72 when the connecting parts 48, 50 are approximated. In this way, the contact element 90 can contact the release element 118 at the latching element 128 and displace it upwards. The release element 118 can be displaced further upwards under the action of the contact element 90 and/or the biasing element 104. At the same time, the locking pin 96 is displaced into the locking position. Thus, self-locking can occur in this case as well.

Figure 8:
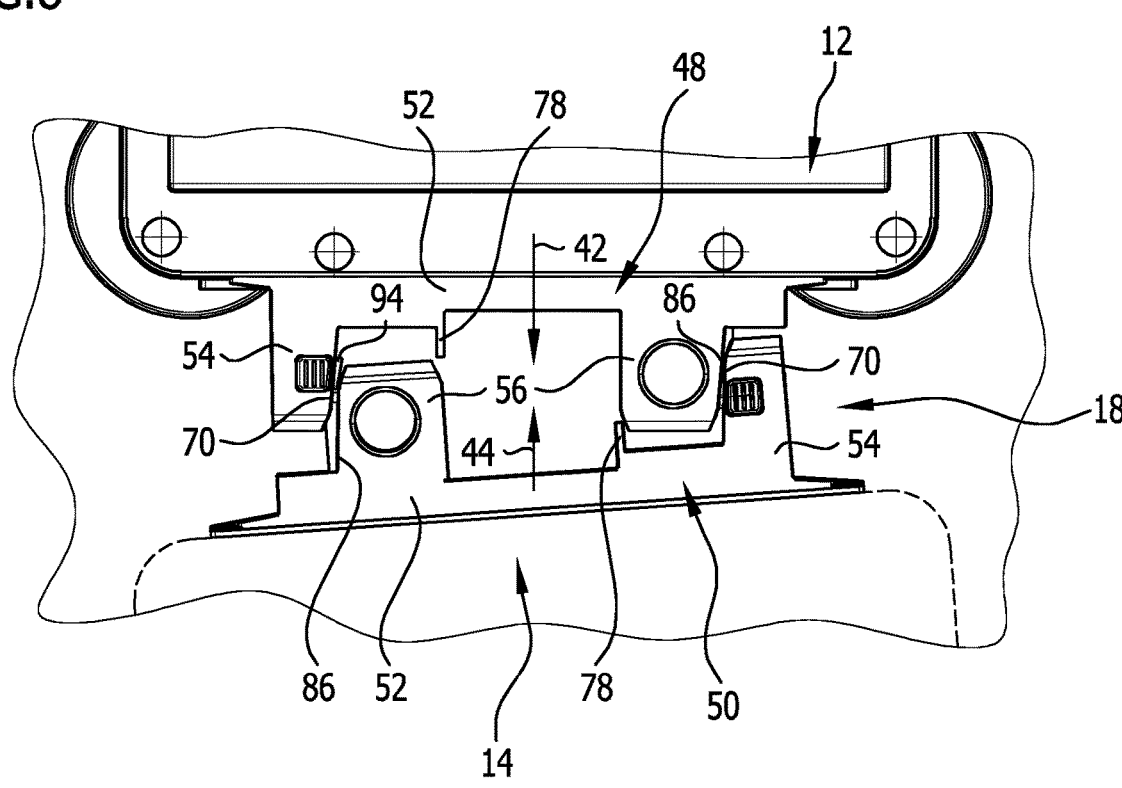
FIGS. 8 and 9 illustrate representations corresponding to FIG. 6 or FIG. 7, wherein the cleaning carts are approximated askew to one another.
Figure 9:
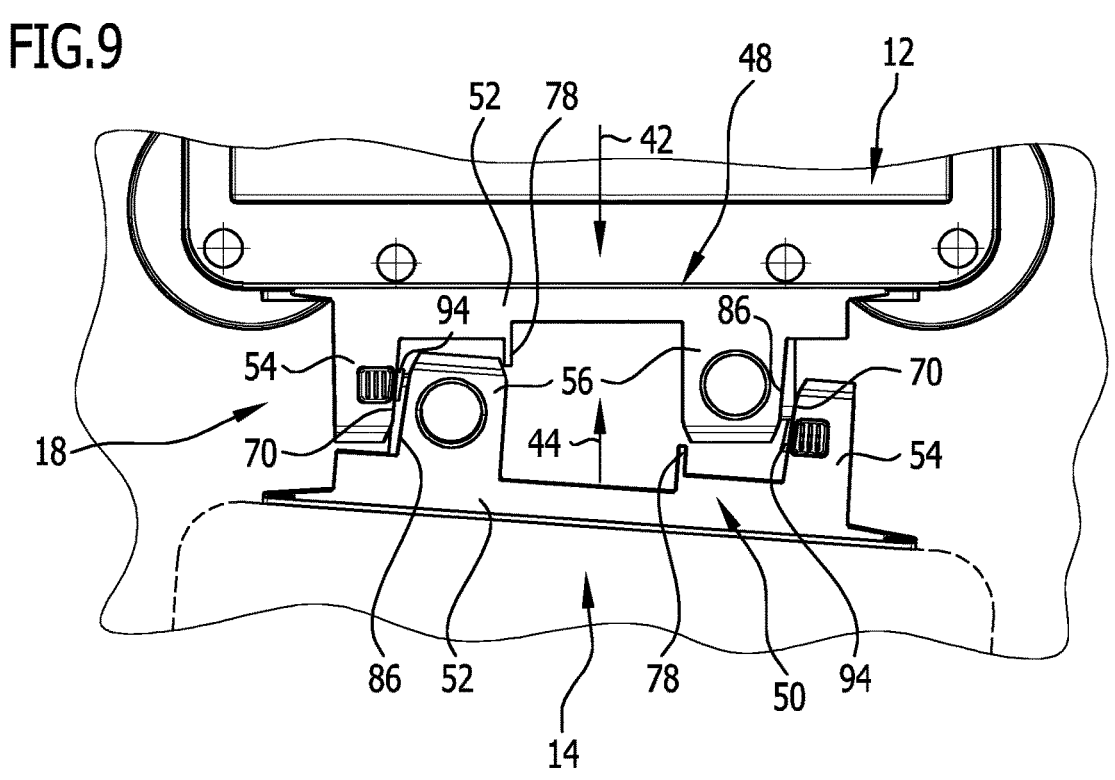

Having both projection regions 54, 56 provided with a taper is advantageous. This affords the connecting parts 48, 50 greater ease to find one another and to align the projection regions 54, 56 if the cleaning carts 12, 14 are moved towards one another askew, deviating from the ideal connecting direction 40. This is illustrated in FIGS. 8 and 9. Here, the orientations of the cleaning carts 12, 14 defined by the arrows 42, 44 assume an angular position. By the inclined contact elements 70 and 86, it is made easier for a user to approximate the connecting parts 48, 50 to one another in order to insert the projection region 54 in the intermediate space 79 and thereby bring the cleaning carts 12, 14 in such a relative position that the locking elements 94 and 130 can be brought into engagement. In these cases, too, the support elements 78 can function as guide elements.

The projection region 54 has lateral chamfers at its contact element 68 at the end face thereof. In a corresponding manner, the projection region 56 has lateral chamfers at its the contact element 84 at the end face thereof. This configuration, which effects a respective tapering of the projection regions 54, 56 at the free ends thereof, makes it even easier to couple the connecting parts 48, 50 to one another.

To effect unlocking, the user actuates the release element 118 at each connecting part 48, 50 by pressing it downwards and transfers same to the release position. The locking pins 96 are thereby transferred to the unlocking position and are brought out of engagement with the blind holes 132. The cleaning carts 12, 14 can thereby be removed from one another.

It is advantageous to have the projection regions 54, 56 of cooperating connecting parts 48 and 50 positioned laterally side by side to one another, transversely and in particular perpendicularly to the connecting direction 40, namely in the transverse direction 46. This significantly facilitates the positioning of the cleaning carts 12, 14 relative to one another by a user such that a reliable connection is possible. Further, by positioning the projection regions 54, 56 laterally side by side to one another, the locking elements 94 and 130 are in the correct relative position to one another for them to be brought in engagement with one another. For this reason, the connection device 18 has improved handleability.

As used in the foregoing explanations of the introduction of the description and in particular the claims, the projection regions 54 and 56 of the connecting part 48 in the present example are taken to be the first and the third projection region, respectively, and the projection regions 56, 54 of the second connecting part 50 are taken to be the second and the fourth projection region, respectively. The locking elements 94, 130 of the first connecting part 48 are taken to be the first and third locking elements, respectively, and the locking elements 130, 94 of the connecting part 50 are taken to be the second and fourth locking elements, respectively.

In the connection state of the connecting parts 48, 50, an enclosed pass-through region 140 is arranged between the two projection regions 56 and the base regions 52, in particular between the end faces 80 thereof. The pass-through region 140 can have cleaning utensils arranged therein, for example.

Figure 16:
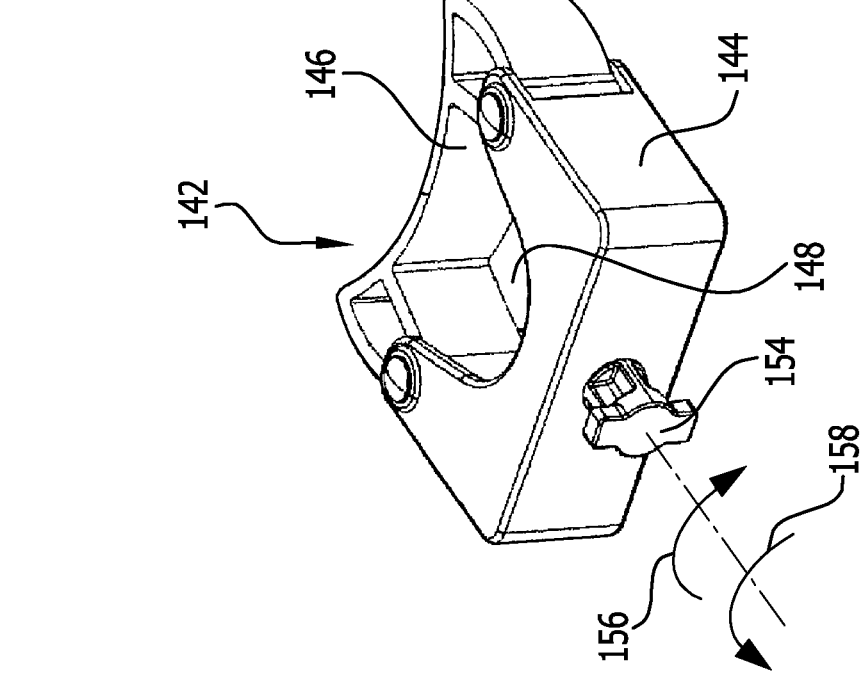
FIG. 16 illustrates a perspective representation of a clamping holder of the cleaning system.

The cleaning system 10 can comprise at least one clamping holder 142, shown by way of example in FIG. 16. The clamping holder 142 comprises a generally C-shaped holding part 144 at which an elastically deformable clamping part 146 is arranged.

The clamping part 146, under deformation thereof, can engage around the cleaning utensil and clampingly hold same in a recess 148 of the holding part 144. The cleaning utensil can be removed from the clamping holder 142 under expansion of the clamping part 146.

Arranged at the connecting parts 48, 50 is in each case a receiving element 150 to which the clamping holder 142 can be fixed, in particular releasably fixed. The receiving element 150 has an insertion opening 152 which can be formed at the end face 80 of the base region 52 in particular. Preferably, the clamping holder 142 is connected to the connecting part 48, 50 when the cleaning carts 12, 14 are in a detached condition from one another. The respective connecting part 48, 50 can thereby serve, in a sense, as an adapter device for the clamping holder 142.

The clamping holder 142 can be connected to the connecting part 48, 50 by way of a bayonet style push-and-twist connection. To this end, a projection 154 at the holding part 144 can be inserted in the insertion opening 152 and, therebehind, latched with the connecting part 48, 50 (not shown). To this end, the clamping holder 142 can first be rotated substantially 90° (arrow 156) and the projection 154 inserted in the insertion opening 152. After this, the clamping holder 142 is rotated substantially 90° in the opposite direction (arrow 158).

As has already mentioned, the respective connecting part 48, 50 can be releasably connected to the cleaning cart 12, 14. To this end, at least one receiving part 160 is arranged at the respective cleaning cart 12, 14 for cooperating with the connecting part 48, 50.

In the present case, the receiving parts 160 are identically configured for each cleaning cart 12 to 16. This gives the possibility of attaching each connecting part 48, 50 to each of the cleaning carts 12 to 16, thus rendering the cleaning system 10 particularly versatile.

Figure 14:
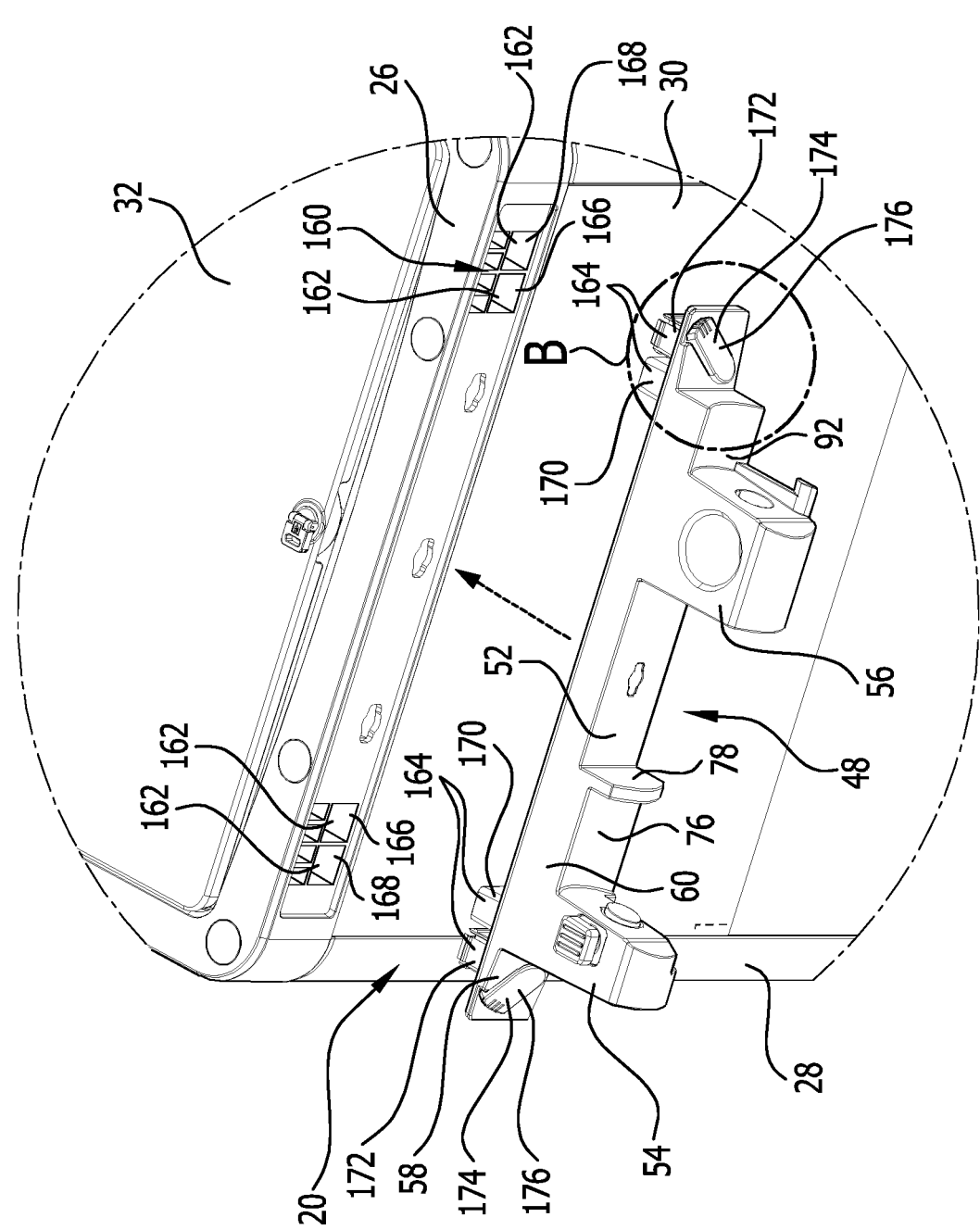
FIG. 14 illustrates a representation similar to FIG. 4 but with the connecting part shown as being separated from the cleaning cart.

The receiving part 160 is illustrated in FIG. 14 in particular, using the example of the cleaning cart 12. By way of example, the receiving part 160 is formed by the frame upper part 26 and comprises coupling elements 162 which can cooperate with corresponding coupling elements 164 of the connecting part 48 (with the parts being identical, this also applies to the connecting part 50).

The coupling elements 162 in the present case comprise clamping receptacles 166 and latching receptacles 168. Two in number are provided in each case. The coupling elements 164 comprise clamping projections 170 and latching projections 172.

The clamping projections 170 are associated with the clamping receptacles 166 and can be clampingly fixed therein. The latching projections 172 are associated with the latching receptacles 168 and can latch therewith.

As a result, via the coupling elements 162, 164, the possibility is given for the connecting part 48 to be fixed to the receiving part 160 by clamping and by latching, in particular by a force-locking and form-locking connection. The connecting part 48 can be released from the receiving part 160 by releasing the engagement of the coupling elements 162, 164.

In the present case, both the connection and the release can be effected in a user-friendly manner by hand and in particular without tools.

It is understood that, differently from what has been described above, provision could be made for the receiving part 160 to comprise projections and for the connecting part 48 to comprise receptacles therefor. However, it is more advantageous if the receptacles are arranged at the receiving part 160; in this way, no coupling elements 162 project beyond the outer contour of the cleaning cart 12.

Figure 15:
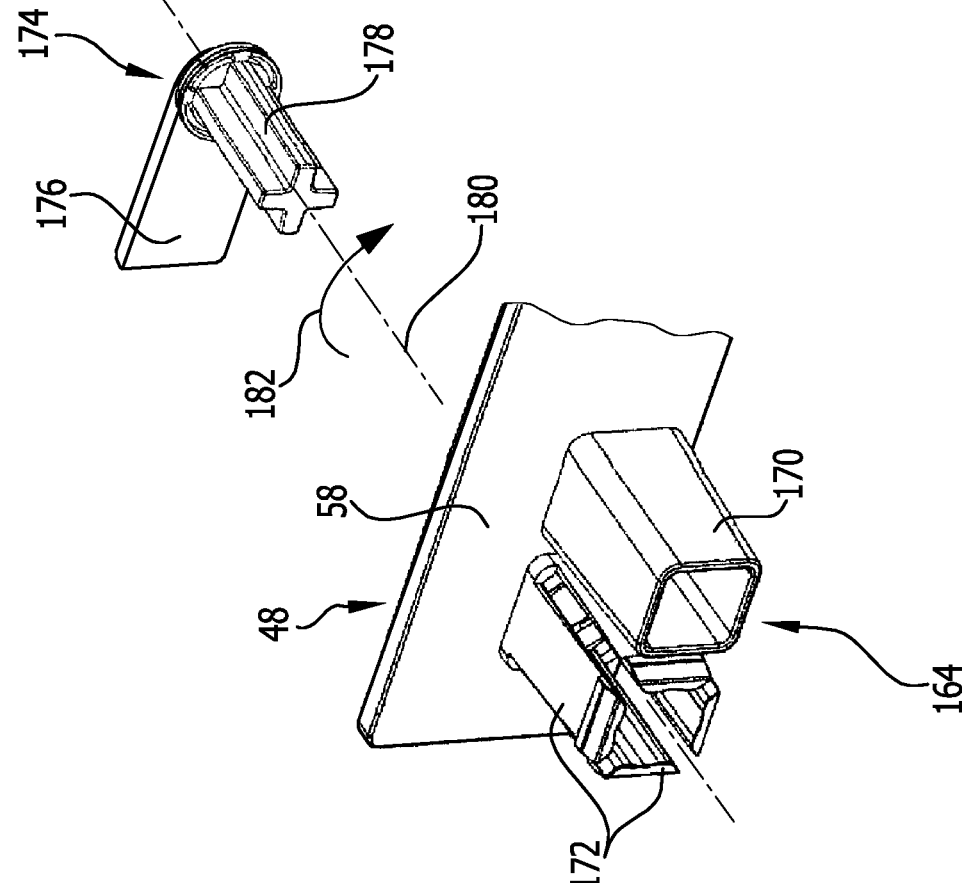
FIG. 15 illustrates a perspective representation of detail B of FIG. 14, viewed from another perspective.

As can be seen from FIGS. 14 and 15 in particular, the coupling elements 164 project from the plate-shaped section 58.

The latching projections 172 are arranged in groups at the connecting part 48. For example, a group of four locking projections 172 is provided in each case. A blocking element 174 is associated with a group of latching projections 172. The blocking element 174 has an actuating section 176 and a blocking section 178. The blocking section 178 can be rotated about an axis 180 by way of the actuating section 176.

The blocking section 178 engages in the interspace between the latching projections 172. When in a blocking position, the blocking section 178, with its, in the present case, +-shaped cross section, is in contact against the latching projections 172. The latching projections 172 are thereby blocked against unlatching. On the other hand, the latching projections 172 can unlatch by rotating the blocking section 178 about the axis 180. An arrow 182 in FIG. 15 indicates the direction of rotation of the blocking element 174 into a release position in order to enable the unlatching.

The blocking section 178 also assumes a release position during latching (FIG. 14) in order to enable latching of the latching projections 172 with the latching receptacles 168. The blocking section 178 can be transferred to the blocking position in a direction opposite the direction of arrow 182.

The actuating sections 176 are arranged at the end sections 62, 64 in each case. An indicating device 184 employing pictograms allows the user to determine the position assumed by the blocking element 174 in each case.

In the cleaning carts 12 to 16, it is advantageous that more than one receiving part 160 can be present. This is illustrated in FIGS. 1 and 3 using the example of the cleaning cart 12. Here, provided at an end face is a receiving part 160 at which the connecting part 48 is arranged. A further receiving part is provided on at least one side 186 that is adjacent at an angle relative to said end face. This provides a way for the cleaning carts 12 to 16 to be interconnected not only linearly but also, in the case of the "longer" cleaning cart 12, in an "L"-shaped pattern.

In particular, multiple connections can also be provided. For example, advantageously, at least one handle device 38 is releasably attached to a receiving part 160. Further cleaning carts can be arranged one behind the other and connected to one another, in a sense, like links in a string. Of course, "L"-shaped connections are preferably possible.

Further, it is preferably provided that at least one receiving part 160 is arranged at the frame lower parts 22 in each case. This allows the cleaning carts to be connected to one another near ground level via the connection device 18. In the positioning of the receiving parts 160 at the frame lower part 22 as well, provision can be made for a plurality of receiving parts 160 to be positioned on different sides of the cleaning carts 12 to 16, with regard to connecting the cleaning carts 12 to 16 with as much versatility and flexibility as possible.

Figures 18, 19:
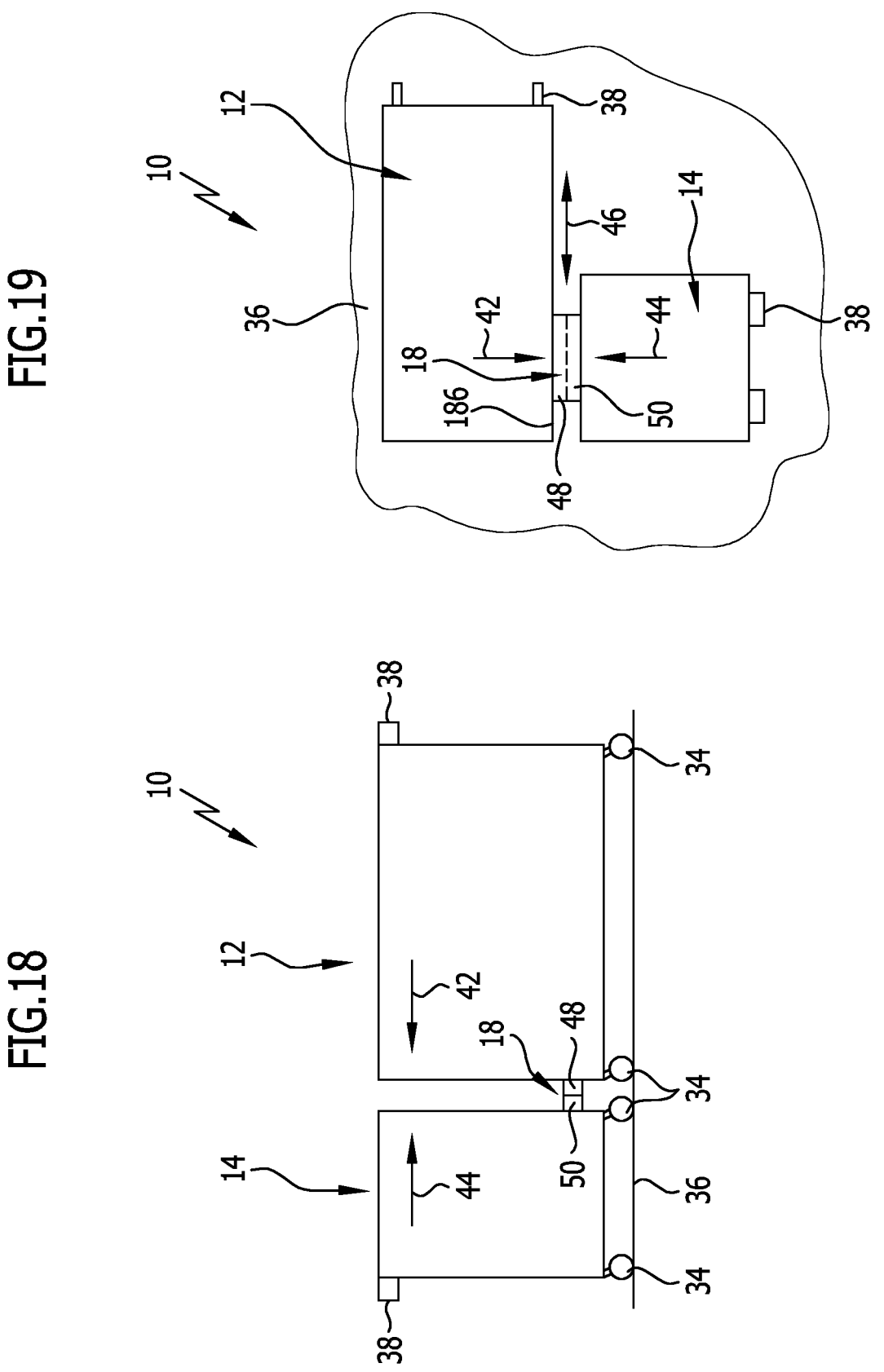
FIG. 18 illustrates, in a schematic side view, the two cleaning carts of the cleaning system of FIG. 1, shown as being interconnected at a respective frame lower part via the connection device.
FIG. 19 illustrates, in a schematic view from above, the two cleaning carts shown as being interconnected in an L-shaped configuration via the connection device.

FIGS. 18 and 19 schematically show the above-described possible ways of interconnecting the cleaning carts 12 and 14.

FIG. 18 shows in a side view how the cleaning carts 12, 14 are connected to one another. Here, the connecting parts 48 and 50 are attached to respective receiving parts which are arranged at respective frame lower parts 22. The cleaning carts 12, 14 in this case are connected to one another at the bottom of the frame 20.

Having the cleaning carts 12, 14 connected to one another at the top of the frame 20—as shown in FIGS. 1 to 14—is, for example, advantageous in that the user can obtain a better view of the connection device 18. This facilitates coupling the cleaning carts 12, 14 to one another. In a corresponding manner, the user is afforded greater ease in releasing the cleaning carts 12, 14 from one another because the release elements 118 are within easy reach of the user.

Apart from the above, cleaning tools and/or cleaning utensils can be passed through the through-opening 136 and the pass-through region 140 and supported, for example, on the connection device 18. The clamping holder 142 is also within easy-to-handle reach.

FIG. 19 shows the cleaning carts 12, 14 as being connected in an "L"-shaped manner. Here, the connecting part 48 is fixed to the receiving part 160 that is arranged on the side 186.

From what has been said above, it is apparent that more than two carts can be connected to one another. In particular, a string of interconnected carts can be formed. To this end, for example, the handle devices 38 are releasable from the cleaning carts 12 and/or 14, wherein a receiving part 160 can preferably be used for their attachment. The handle device 38 can be replaced by the connecting part 48 or 50 in order to couple a further cleaning cart in lieu thereof.

Of course, also conceivable is to interconnect more than two cleaning carts in an "L"-shaped configuration, or, in a sense, in an array.

It is understood that connecting the cleaning carts of the cleaning system in accordance with the invention in an "L"-shaped configuration can also be accomplished with receiving parts arranged at the frame lower part 22.

LIST OF REFERENCE CHARACTERS

10 cleaning system
12, 14, 16 cleaning cart
18 connection device
20 frame
22 frame lower part
24 height direction
26 frame upper part
28 profile part
30 side wall
32 top wall
34 roller
36 ground surface
38 handle device
40 connecting direction
42, 44 arrow
46 transverse direction
48 first connecting part
50 second connecting part
52 base region
54, 56 projection region
58 plate-shaped section
60 socket section
62, 64 end section
66 side face
68 contact element
69 bearing element
70 contact element
72 recess
74 lower wall
76 contact element
77 bearing element
78 support element
79 intermediate space
80 end face
82 side face
84 contact element
85 bearing element
86 contact element
88 lower wall
90 contact element
92 contact element
93 bearing element
94 locking element
96 locking pin
98 axis
100 sleeve
102 anti-rotation element
104 biasing element
106 helical spring
108, 110 stop
112 slide element
114 through-opening
116 slide element
118 release element
120 pushbutton
122 section
124 opening
126 slide element
128 latching element
130 locking element
132 blind hole
136 through-opening

138 pivot axis
140 pass-through region
142 clamping holder
144 holding part
146 clamping part
148 recess
150 receiving element
152 insertion opening
154 projection
156, 158 arrow
160 receiving part
162, 164 coupling element
166 clamping receptacle
168 latching receptacle
170 clamping projection
172 latching projection
174 blocking element
176 actuating section
178 blocking section
180 axis
182 arrow
184 indicating device
186 side

What is claimed is:

1. A connection device for connecting a first cleaning cart to a second cleaning cart along a connecting direction, each configured for receiving cleaning utensils and comprising rollers for moving on a ground surface, wherein the connection device comprises a first connecting part fixed or fixable to the first cleaning cart and a second connecting part fixed or fixable to the second cleaning cart, wherein the respective connecting part comprises a base region and a projection region projecting therefrom in a direction towards the respective other connecting part, wherein a first locking element is arranged at the first projection region of the first connecting part and a second locking element is arranged at the second projection region of the second connecting part, wherein the locking elements are configured to be in engagement with one another when in a locking position and to be out of engagement when in an unlocking position, wherein the projection regions are arranged transversely to the connecting direction, in lateral side-by-side relation to one another, and wherein a through-opening is formed at at least one of the first projection region and the second projection region for passing a cleaning tool therethrough.

2. The connection device in accordance with claim 1, wherein at least one of the following applies:
   the first projection region and the second projection region are arranged in direct lateral side-by-side relation to one another;
   the projection regions of the first connecting part and the second connecting part are in contact laterally against one another via corresponding contact elements.

3. The connection device in accordance with claim 2, wherein at least one of the projection regions has, in the area of the contact element thereof, a taper starting from the base region in a direction towards the respective other connecting part.

4. The connection device in accordance with claim 1, wherein at least one of the following applies:
   at least one of the projection regions has bevels on a side thereof that faces away from the base region in order to facilitate the relative orientation of the connecting parts when they are approximated to one another;

when in the locking position, the first locking element and the second locking element are in engagement with one another in at least one of a force-locking and a form-locking manner.

5. The connection device in accordance with claim 1, wherein the first locking element and the second locking element comprise a locking projection movably arranged on one of the projection regions and a receptacle for the projection that is arranged on the respective other projection region.

6. The connection device in accordance with claim 5, wherein at least one of the following applies:
the projection is configured as a locking pin, and the receptacle is configured as a blind hole or as a through-opening at the projection region;
the projection and the receptacle each have a round cross section.

7. The connection device in accordance with claim 1, wherein at least one of the following applies:
at least one locking element is movably or displaceably supported on the projection region;
the first locking element and the second locking element are oriented in a coaxial relation to one another, with respect to a common axis.

8. The connection device in accordance with claim 7, wherein the first connecting part and the second connecting part are configured to be pivotable relative to one another about the axis.

9. The connection device in accordance with claim 7, wherein the axis is at least one of configured transversely to the connecting direction and oriented parallel to a contact plane defined by rollers of the cleaning carts for supporting the cleaning cart on the ground surface.

10. The connection device in accordance with claim 1, wherein a projection region of one connecting part and a base region of the other connecting part form corresponding contact elements, wherein the projection region, at an end face thereof, is in contact against the base region.

11. The connection device in accordance with claim 10, wherein the first connecting part and the second connecting part are configured to be pivotable relative to one another about the axis and wherein the contact elements form corresponding bearing elements when the connecting parts are pivoted relative to one another.

12. The connection device in accordance with claim 1, wherein, when the connecting parts are connected to one another, the first locking element is brought into engagement with the second locking element automatically to assume the locking position.

13. The connection device in accordance with claim 1, wherein the connection device comprises a biasing element and wherein the first locking element is biased in a direction towards the locking position via the biasing element.

14. The connection device in accordance with claim 13, wherein the biasing element is configured as a spring element which surrounds the first locking element configured as a locking pin in sections thereof and is supported on the latter and on the first projection region.

15. The connection device in accordance with claim 13, wherein the first locking element comprises a slide element with which the second projection region mechanically contacts when the connecting parts are connected and thereby displaces the first locking element into the unlocking position against the action of the biasing element.

16. The connection device in accordance with claim 1, wherein a support element is arranged at at least one of the connecting parts and wherein the projection region of the respective other connecting part is arranged between the projection region of the former connecting part and the support element.

17. The connection device in accordance with claim 1, wherein the connection device comprises a release element operatively connected to the first locking element, wherein the first locking element is transferable from the locking position to the unlocking position by way of the release element.

18. The connection device in accordance with claim 17, wherein at least one of the following applies:
the release element is movably or displaceably supported on the first projection region;
the release element is displaceable transversely to a displacement direction of the first locking element in order to transfer the first locking element to the unlocking position;
the release element and the first locking element comprise cooperating slide elements and are, via these, in contact one against the other.

19. The connection device in accordance with claim 17, wherein at least one of the following applies:
the release element comprises a pushbutton where pressing the pushbutton causes the first locking element to be transferred from the locking position to the unlocking position;
the release element is of pin-shaped configuration;
the release element is configured to assume a release position in which the first locking element assumes the unlocking position, and a neutral position in which the first locking element assumes the locking position.

20. The connection device in accordance with claim 19, wherein at least one of the following applies:
a contact element for the release element assuming the release position is arranged or formed at the second projection region, wherein, when the connecting parts are connected, the contact element mechanically contacts the release element so as to transfer the release element in a direction towards the neutral position;
the release element in the release position passes through the first projection region and engages in a recess formed at the first projection region, which recess receives the contact element when the connecting parts are connected.

21. The connection device in accordance with claim 1, wherein the first connecting part and the second connecting part each comprise two projection regions, wherein the first projection region and the first locking element are arranged at the first connecting part and the second projection region and the second locking element are arranged at the second connecting part, and wherein a third projection region and a third locking element are arranged at the first connecting part and a fourth projection region and a fourth locking element are arranged at the second connecting part.

22. The connection device in accordance with claim 21, wherein the second projection region and the third projection region are arranged between the first projection region and the fourth projection region, in a direction transverse to the connecting direction.

23. The connection device in accordance with claim 21, wherein the fourth projection region is configured identically to the first projection region and/or wherein the third projection region is configured identically to the second projection region.

24. The connection device in accordance with claim 21, wherein the fourth locking element is configured identically to the first locking element and/or wherein the third locking element is configured identically to the second locking element.

25. The connection device in accordance with claim 1, wherein at least one of the following applies:

the base regions of the connecting parts are identically configured;

the first connecting part and the second connecting part are configured as identical parts.

26. The connection device in accordance with claim 1, wherein formed between a projection region of the first connecting part and a projection region of the second connecting part, is a pass-through region which is at least partially enclosed by the base regions and the two projection regions.

27. The connection device in accordance with claim 1, wherein arranged at at least one of the connecting parts is a receiving element for attaching a clamping holder for cleaning utensils.

28. A cleaning system, comprising a first cleaning cart and a second cleaning cart, which are each configured for receiving cleaning utensils and comprise rollers for moving on a ground surface, wherein the cleaning system comprises a connection device for connecting the first cleaning cart to the second cleaning cart along a connecting direction, wherein the connection device comprises a first connecting part fixed or fixable to the first cleaning cart and a second connecting part fixed or fixable to the second cleaning cart, wherein the respective connecting part comprises a base region and a projection region projecting therefrom in a direction towards the respective other connecting part, wherein a first locking element is arranged at the first projection region of the first connecting part and a second locking element is arranged at the second projection region of the second connecting part, wherein the locking elements are configured to be in engagement with one another when in a locking position and to be out of engagement when in an unlocking position, wherein the projection regions are arranged transversely to the connecting direction, in lateral side-by-side relation to one another, and wherein a through-opening is formed at at least one of the first projection region and the second projection region for passing a cleaning tool therethrough.

29. The cleaning system in accordance with claim 28, wherein arranged or formed at at least one cleaning cart is at least one receiving part at which coupling elements are arranged which cooperate with coupling elements, configured correspondingly thereto, of at least one connecting part, for releasably connecting the connecting part to the cleaning cart.

30. The cleaning system in accordance with claim 29, wherein at least one of the following applies:

the connecting part is connectable to the cleaning cart by hand and/or without tools;

the coupling elements cooperate by a force-locking and/or form-locking connection.

31. The cleaning system in accordance with claim 29, wherein two or more receiving parts are arranged or formed at different positions on the cleaning cart and wherein the connecting part is selectively connectable to one of the receiving parts.

32. The cleaning system in accordance with claim 29, wherein the cleaning cart comprises a frame having a frame lower part to which the rollers are held, and having at least one frame upper part arranged above the frame lower part and arranged a distance apart from the frame lower part, and wherein at least one of the following applies:

at least one receiving part is arranged or formed at the frame upper part, at least one receiving part is arranged or formed at the frame lower part.

33. The cleaning system in accordance with claim 32, wherein two or more receiving parts are arranged or formed at at least one of the frame upper part and the frame lower part, and wherein two receiving parts are arranged at at least one of the frame upper part and the frame lower part:

on sides of the frame that face away from one another; and/or on two sides of the frame adjacent to one another at an angle.

34. The cleaning system in accordance with claim 29, wherein at least one receiving part is arranged or formed at each cleaning cart.

\* \* \* \* \*